US011700084B2

(12) United States Patent
Ko et al.

(10) Patent No.: US 11,700,084 B2
(45) Date of Patent: *Jul. 11, 2023

(54) WIRELESS COMMUNICATION METHOD AND WIRELESS COMMUNICATION TERMINAL FOR COEXISTENCE WITH LEGACY WIRELESS COMMUNICATION TERMINAL

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,296

(22) Filed: Aug. 20, 2021

(65) Prior Publication Data
US 2021/0385042 A1 Dec. 9, 2021

Related U.S. Application Data

(63) Continuation of application No. 16/835,305, filed on Mar. 31, 2020, now Pat. No. 11,128,421, which is a
(Continued)

(30) Foreign Application Priority Data

Jun. 29, 2015 (KR) .......................... 10-2015-0092525
Aug. 20, 2015 (KR) .......................... 10-2015-0117434

(51) Int. Cl.
H04L 1/00 (2006.01)
H04L 27/18 (2006.01)
(Continued)

(52) U.S. Cl.
CPC .......... *H04L 1/0079* (2013.01); *H04L 5/0046* (2013.01); *H04L 5/0048* (2013.01);
(Continued)

(58) Field of Classification Search
CPC ....... H04L 1/0031; H04L 1/0079; H04L 1/08; H04L 5/0046; H04L 5/0048;
(Continued)

(56) References Cited

U.S. PATENT DOCUMENTS 9,641,234 B2 * 5/2017 Moon ..................... H04L 69/22
9,699,727 B2   7/2017 Kenney et al.
(Continued)

FOREIGN PATENT DOCUMENTS

CN    1716957     1/2006
CN    101102245   1/2008
(Continued)

OTHER PUBLICATIONS

International Search Report for PCT/KR2016/006976 dated Oct. 31, 2016 and its English translation from WIPO (published as WO 2017/003185).
(Continued)

*Primary Examiner* — Eric Nowlin
(74) *Attorney, Agent, or Firm* — Ladas & Parry, LLP

(57) ABSTRACT

A wireless communication terminal for wireless communication is disclosed. The wireless communication terminal includes: a transceiver; and a processor. The processor is configured to transmit a non-legacy physical layer frame including a legacy signaling field including information
(Continued)

decodable by a legacy wireless communication terminal by using the transceiver.

8 Claims, 27 Drawing Sheets

Related U.S. Application Data continuation of application No. 16/396,635, filed on Apr. 27, 2019, now Pat. No. 10,651,992, which is a continuation of application No. 15/854,662, filed on Dec. 26, 2017, now Pat. No. 10,313,077, which is a continuation of application No. PCT/KR2016/006976, filed on Jun. 29, 2016.

(51) Int. Cl.
```
H04L 27/26      (2006.01)
H04L 5/00       (2006.01)
H04L 69/323     (2022.01)
H04L 69/18      (2022.01)
H04L 1/08       (2006.01)
H04W 80/04      (2009.01)
H04W 84/12      (2009.01)
```
(52) U.S. Cl.
CPC .......... *H04L 5/0053* (2013.01); *H04L 5/0092* (2013.01); *H04L 27/18* (2013.01); *H04L 27/2602* (2013.01); *H04L 27/2603* (2021.01); *H04L 27/2613* (2013.01); *H04L 69/18* (2013.01); *H04L 69/323* (2013.01); *H04L 1/08* (2013.01); *H04L 27/26025* (2021.01); *H04L 27/26132* (2021.01); *H04L 27/26136* (2021.01); *H04W 80/045* (2013.01); *H04W 84/12* (2013.01)

(58) Field of Classification Search
CPC ................. H04L 5/0053; H04L 5/0092; H04L 27/08018; H04L 27/18; H04L 27/2601; H04L 27/2602; H04L 27/2603; H04L 27/26025; H04L 27/2613; H04L 27/26132; H04L 27/26136; H04L 29/08018; H04L 69/18; H04L 69/323; H04W 80/045; H04W 84/12
See application file for complete search history.

(56) References Cited

U.S. PATENT DOCUMENTS

| | | | |
|---|---|---|---|
| 9,749,975 B2* | 8/2017 | Chu | H04W 74/08 |
| 9,893,790 B2* | 2/2018 | Moon | H04B 7/0452 |
| 10,038,518 B1 | 7/2018 | Sun et al. | |
| 10,187,314 B2* | 1/2019 | Bharadwaj | H04L 27/2602 |
| 10,285,066 B2* | 5/2019 | Kim | H04W 16/14 |
| 10,420,121 B2* | 9/2019 | Hedayat | H04L 27/2602 |
| 10,575,249 B2* | 2/2020 | Park | H04W 74/0816 |
| 11,102,721 B2* | 8/2021 | Park | H04W 74/002 |
| 11,128,421 B2* | 9/2021 | Ko | H04L 27/2603 |
| 11,395,311 B2* | 7/2022 | Hedayat | H04L 27/2602 |
| 2012/0275446 A1 | 11/2012 | Stacey et al. | |
| 2012/0327871 A1 | 12/2012 | Ghosh et al. | |
| 2012/0327915 A1 | 12/2012 | Kang et al. | |
| 2013/0286959 A1 | 10/2013 | Lou et al. | |
| 2014/0348097 A1 | 11/2014 | Park et al. | |
| 2015/0139089 A1 | 5/2015 | Azizi et al. | |
| 2015/0139206 A1 | 5/2015 | Azizi et al. | |
| 2015/0312907 A1* | 10/2015 | Lee | H04L 5/0053 370/338 |
| 2016/0156438 A1 | 6/2016 | Sun et al. | |
| 2016/0285608 A1 | 9/2016 | Kwon et al. | |
| 2016/0315681 A1* | 10/2016 | Moon | H04W 74/0816 |
| 2017/0201305 A1* | 7/2017 | Moon | H04W 74/0816 |
| 2017/0289819 A1* | 10/2017 | Kim | H04W 16/14 |
| 2018/0020460 A1* | 1/2018 | Hedayat | H04W 72/12 |
| 2018/0123757 A1 | 5/2018 | Ko et al. | |
| 2019/0260536 A1 | 8/2019 | Ko et al. | |
| 2019/0364577 A1* | 11/2019 | Hedayat | H04B 7/0413 |
| 2020/0196236 A1* | 6/2020 | Park | H04W 52/0229 |
| 2021/0360525 A1* | 11/2021 | Park | H04W 74/002 |
| 2021/0385042 A1* | 12/2021 | Ko | H04L 27/2603 |
| 2022/0312428 A1* | 9/2022 | Hedayat | H04W 72/121 |

FOREIGN PATENT DOCUMENTS

| | | |
|---|---|---|
| CN | 103534966 | 1/2014 |
| KR | 10-2011-0046333 | 5/2011 |
| KR | 10-2015-0033746 | 4/2015 |
| WO | 2017/003185 | 1/2017 |

OTHER PUBLICATIONS

Written Opinion of the International Searching Authority for PCT/KR2016/006976 dated Oct. 31, 2016 and its English machine translation from WIPO (published as WO 2017/003185).
International Preliminary Report on Patentability (Chapter I) for PCT/KR2016/006976 dated Jan. 2, 2018 and its English translation from WIPO (now published as WO 2017/003185).
Notice of Allowance dated Jan. 16, 2019 for U.S. Appl. No. 15/854,662 (published as US 2018/0123757).
Office Action dated Feb. 19, 2020 for Chinese Patent Application No. 201680038677.1 and its English translation provided by Applicant's foreign counsel.
Office Action dated Feb. 28, 2020 for Indian Patent Application No. 201827002334.
Notice of Allowance dated Jan. 8, 2020 for U.S. Appl. No. 16/396,635 (published as US 2019/0260536).
Office Action dated Sep. 20, 2019 for U.S. Appl. No. 16/396,635 (published as US 2019/0260536).
Notice of Allowance dated May 20, 2021 for U.S. Appl. No. 16/835,305 (published as US 2020/0228279).
Office Action dated Feb. 1, 2021 for U.S. Appl. No. 16/835,305 (published as US 2020/0228279).
Decision for Grant dated Aug. 4, 2020 for Korean Patent Application No. 10-2018-700373 and its English translation provided by Applicant's foreign counsel.
Decision for Grant dated Aug. 12, 2020 for Chinese Patent Application No. 201680038677.1 and its English translation provided by Applicant's foreign counsel.
Yongho Seok et al.: "Beamformed HE PPDU", doc: IEEE 802.11-15/0597r1, May 13, 2015. Slides 1-13.
Young Hoon Kwon et al.: "SIG Field Design Principle for 11ax", doc: IEEE 802.11-15/0344r1, May 9, 2015. Slides 1-17.
Jiayin Zhang et al.: "Preamble structure for 11ax system", doc: IEEE 802.11-15/0101r1, Jan. 2015. Slides 1-18.
Robert Stacey: "Wireless LANs Specification Framework for TGax", doc: IEEE 802.11-15/0132r5. pp. 1-7.
Office Action dated Jul. 7, 2021 for Korean Patent Application No. 10-2021-7007790 and its English translation provided by Applicant's foreign counsel.
Rejection dated May 25, 2022 for Korean Patent Application No. 10-2021-7007790 and its English translation provided by Applicant's foreign counsel.
Hongyuan Zhang et al.: "HE PHY Padding and Packet Extension", IEEE 802.11-15/0810, Jul. 10, 2015, slides 1-38.
Hongyuan Zhang et al.: "802.11ax Preamble Design and Auto-detection", IEEE 802.11-15/0579, Jul. 10, 2015, slides 1-35.
Notice of Allowance dated Sep. 14, 2022 for Korean Patent Application No. 10-2021-7007790 and its English translation provided by Applicant's foreign counsel.

* cited by examiner $$TXTIME = T_{L\_PREAMBLE} + T_{HE\_PREAMBLE} + T_{HE\_DATA} + T_{PE}$$

where $T_{HE\_DATA} = T_{HE\_SYM} \times N_{SYM} = (12.8 + T_{GI}) \times N_{SYM}$ $$L\_LENGTH = \underbrace{\left\lceil \frac{TXTIME - T_{L\_PREAMBLE}}{aSymbolLength} \right\rceil \times N_{OPS}}_{2401} - \underbrace{\left\lceil \frac{aPLCPServiceLength + aPLCPTailLength}{8} \right\rceil}_{2402}$$

$$= \left\lceil \frac{TXTIME - 20}{4} \right\rceil \times 3 - 3$$

where $\lceil x \rceil$    denotes the smallest integer greater than or equal to $x$ (ceiling)

$TXTIME$    is the duration of PPDU $T_{L\_PREAMBLE}$    is the duration of L preamble (that is, summation of L-STF, L-LTF, and L-SIG durations)

$aSymbolLength$    is the duration of a symbol $N_{OPS}$    is the number of octets transmitted during a period of $aSymbolLength$ at the rate specified by $L\_DATARATE$ $aPLCPServiceLength$    is the number of bits in the PLCP SERVICE field $aPLCPTailLength$    is the number of bits in the tail bit

*FIG. 24*

$$T_{PE} + aSymbolLength \times \left( \left\lceil \frac{TXTIME - T_{L\_PREAMBLE}}{aSymbolLength} \right\rceil - \left( \frac{TXTIME - T_{L\_PREAMBLE}}{aSymbolLength} \right) \right) \geq T_{SYM}$$

$$\Rightarrow T_{PE} + 4 \times \left( \left\lceil \frac{TXTIME - 20}{4} \right\rceil - \left( \frac{TXTIME - 20}{4} \right) \right) \geq T_{SYM}$$

2501 where  $\lceil x \rceil$  denotes the smallest integer greater than or equal to $x$ (ceiling)

$TXTIME$  is the duration of PPDU $T_{L\_PREAMBLE}$  is the duration of L preamble (that is, summation of L-STF, L-LTF, and L-SIG durations)

$aSymbolLength$  is the duration of a symbol $T_{PE}$  is the duration of packet extension $T_{SYM}$  is the duration of HE symbol

FIG. 25

$$N_{SYM} = \left\lfloor \left( \frac{L\_LENGTH+3}{3} \right) \times 4 - T_{HE\_PREAMBLE} \right) / T_{SYM} \right\rfloor - b_{PE\_Disambiguity}$$

$$T_{PE} = \left\lfloor \frac{\left( \frac{L\_LENGTH+3}{3} \right) \times 4 - T_{HE\_PREAMBLE} \right) - N_{SYM} \times T_{SYM}}{4} \right\rfloor \times 4$$

where   $\lfloor x \rfloor$   denotes the largest integer less than or equal to $x$ (flooring)

$L\_LENGTH$ $b_{PE\_Disambiguity}$ $T_{HE\_PREAMBLE}$ $T_{SYM}$

FIG. 26

$$RXTIME = \left\lceil \frac{L\_LENGTH + \left\lceil \frac{aPLCPServiceLength + aPLCPTailLength}{8} \right\rceil}{N_{DBPS}} \right\rceil \times aSymbolLength + T_{L\_PREAMBLE}$$

$$= \left\lceil \frac{L\_LENGTH + 3}{3} \right\rceil \times 4 + 20$$

where

| | |
|---|---|
| $\lceil x \rceil$ | denotes the smallest integer greater than or equal to $x$ (ceiling) |
| $L\_LENGTH$ | is the Length field value in L-SIG |
| $aSymbolLength$ | is the duration of a symbol |
| $N_{DBPS}$ | is the number of octets transmitted during a period of $aSymbolLength$ at the rate specified by $L\_DATARATE$ |
| $aPLCPServiceLength$ | is the number of bits in the PLCP SERVICE field |
| $aPLCPTailLength$ | is the number of bits in the tail bit |
| $T_{L\_PREAMBLE}$ | is the duration of L preamble (that is, summation of L-STF, L-LTF, and L-SIG durations) |

FIG. 27

$$L\_LENGTH_{protection} = \left\lceil \frac{TXTIME - T_{L\_PREAMBLE}}{aSymbolLength} \right\rceil \times N_{OPS} - \left\lceil \frac{aPLCPServiceLength + aPLCPTailLength}{8} \right\rceil + m$$

$$= \left\lceil \frac{TXTIME - 20}{4} \right\rceil \times 3 - 3 + m, \quad m = 1 \text{ or } 2$$

where  $\lceil x \rceil$  denotes the smallest integer greater than or equal to $x$ (ceiling)

$TXTIME$ is the duration of PPDU $T_{L\_PREAMBLE}$ is the duration of L preamble (that is, summation of L-STF, L-LTF, and L-SIG durations)

$aSymbolLength$ is the duration of a symbol $N_{OPS}$ is the number of octets transmitted during a period of $aSymbolLength$ at the rate specified by L_DATARATE $aPLCPServiceLength$ is the number of bits in the PLCP SERVICE field $aPLCPTailLength$ is the number of bits in the tail bit

FIG. 28

$$N_{SYM} = \left\lfloor \left( \frac{L\_LENGTH - m + 3}{3} \times 4 - T_{HE\_PREAMBLE} \right) / T_{SYM} \right\rfloor - b_{PE\_Disambiguity}$$

$$T_{PE} = \left\lfloor \frac{\left( \frac{L\_LENGTH - m + 3}{3} \times 4 - T_{HE\_PREAMBLE} \right) - N_{SYM} \times T_{SYM}}{4} \right\rfloor \times 4$$

where  $\lfloor x \rfloor$  denotes the largest integer less than or equal to $x$ (flooring)

$L\_LENGTH$  is the Length field value in L-SIG $b_{PE\_Disambiguity}$  is PE-Disambiguity field value (0 or 1)

$T_{HE\_PREAMBLE}$  is the duration of HE preamble $T_{SYM}$  is the duration of HE symbol

FIG. 29

$$L\_LENGTH_{fairness} = \left\lceil \frac{TXTIME - T_{L\_PREAMBLE}}{aSymbolLength} \right\rceil \times N_{OPS} - \left\lceil \frac{aPLCPServiceLength + aPLCPTailLength}{8} \right\rceil - m$$

$$= \left\lceil \frac{TXTIME - 20}{4} \right\rceil \times 3 - 3 - m, \quad m = 1 \text{ or } 2$$

where  $\lceil x \rceil$         denotes the smallest integer greater than or equal to $x$ (ceiling)

$TXTIME$         is the duration of PPDU $T_{L\_PREAMBLE}$     is the duration of L preamble (that is, summation of L-STF, L-LTF, and L-SIG durations)

$aSymbolLength$    is the duration of a symbol $N_{OPS}$         is the number of octets transmitted during a period of $aSymbolLength$ at the rate specified by L_DATARATE $aPLCPServiceLength$  is the number of bits in the PLCP SERVICE field $aPLCPTailLength$   is the number of bits in the tail bit

FIG. 30

$$N_{SYM} = \left\lceil \left( \frac{\left\lfloor \frac{L\_LENGTH + m + 3}{3} \right\rfloor \times 4 - T_{HE\_PREAMBLE}}{T_{SYM}} \right) - b_{PE\_Disambiguity} \right\rceil$$

$$T_{PE} = \left\lfloor \frac{\left( \frac{L\_LENGTH + m + 3}{3} \right) \times 4 - T_{HE\_PREAMBLE} - N_{SYM} \times T_{SYM}}{4} \right\rfloor \times 4$$

where  $\lfloor x \rfloor$    denotes the largest integer less than or equal to $x$ (flooring)

$L\_LENGTH$    is the Length field value in L-SIG $b_{PE\_Disambiguity}$    is PE-Disambiguity field value (0 or 1)

$T_{HE\_PREAMBLE}$    is the duration of HE preamble $T_{SYM}$    is the duration of HE symbol

FIG. 31

WIRELESS COMMUNICATION METHOD AND WIRELESS COMMUNICATION TERMINAL FOR COEXISTENCE WITH LEGACY WIRELESS COMMUNICATION TERMINAL

CROSS-REFERENCE TO RELATED APPLICATIONS

This application is a continuation of U.S. patent application Ser. No. 16/835,305 filed on Mar. 31, 2020, which is a continuation of Ser. No. 16/396,635 filed on Apr. 27, 2019, which is a continuation of U.S. patent application Ser. No. 15/854,662 filed on Dec. 26, 2017, which is a continuation of International Patent Application No. PCT/KR2016/006976 filed on Jun. 29, 2016, which claims the priority to Korean Patent Application No. 10-2015-0092525 filed in the Korean Intellectual Property Office on Jun. 29, 2015, and Korean Patent Application No. 10-2015-0117434 filed in the Korean Intellectual Property Office on Aug. 20, 2015, the entire contents of which are incorporated herein by reference.

TECHNICAL FIELD

The present invention relates to an efficient wireless communication method in a wireless communication environment in which a legacy wireless communication terminal and a non-legacy wireless communication terminal coexist, and a wireless communication terminal using the same.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An embodiment of the present invention is to provide an efficient wireless communication method and wireless communication terminal.

In particular, an embodiment of the present invention is to provide a wireless communication method and a wireless communication terminal for coexistence with a legacy wireless communication terminal.

Technical Solution

According to an embodiment of the present invention, a wireless communication terminal that communicates wirelessly includes: a transceiver; and a processor. The processor may be configured to receive a non-legacy physical layer frame by using the transceiver and obtains a legacy signaling field including information decodable by a legacy wireless communication terminal from the non-legacy physical layer frame, obtain length information indicating information on a duration of the non-legacy physical layer frame, from the legacy signaling field, obtain information other than information on the duration of the non-legacy physical layer frame through a remaining value obtained by dividing the length information by a data size transmittable by a symbol of a legacy physical layer frame, wherein the data size transmittable by a symbol of the legacy physical layer frame is 3 octets when a data rate of the legacy physical layer frame is 6 Mbps, and determine the number of symbols of data of the non-legacy physical layer frame according to a following equation, $$N_{SYM} \left\lfloor \left( \frac{L\_LENGTH + m + 3}{3} \right) \times 4 - T_{HE\_PREAMBLE} \right) \Big/ T_{SYM} \right\rfloor - b_{PE\_Disambiguity}$$

where $\lfloor x \rfloor$ denotes a largest integer less than or equal to x,
L_LENGTH denotes the length information,
m denotes a value obtained by subtracting the remaining value from the data size transmittable by a symbol of the legacy physical layer frame,
$b_{PE\_Disambiguity}$ denotes a value of PE Disambiguity field,
$T_{HE\_PREAMBLE}$ denotes a duration of non-legacy preamble of the non-legacy physical layer frame,
$T_{SYM}$ denotes a duration of a symbol of the data of the non-legacy physical layer frame. The PE Disambiguity field may be set based on the duration of a symbol of the data of the non-legacy physical layer frame and an increment of duration to set a value of the length information based on a duration of a symbol of the legacy physical layer frame.

The processor may be configured to obtain a duration of a packet extension which is a padding of the non-legacy physical layer frame, according to a following equation, $$T_{PE} \left\lfloor \frac{\left( \frac{L\_LENGTH + m + 3}{3} \right) \times 4 - T_{HE\_PREAMBLE}) - N_{SYM} \times T_{SYM}}{4} \right\rfloor \times 4$$

where $\lfloor x \rfloor$ denotes a largest integer less than or equal to x,
L_LENGTH denotes the length information,
m denotes the value obtained by subtracting the remaining value from the data size transmittable by a symbol of the legacy physical layer frame,
$T_{HE\_PREAMBLE}$ denotes the duration of non-legacy preamble of the non-legacy physical layer frame,
$T_{SYM}$ denotes the duration of a symbol of the data of the non-legacy physical layer frame.

The increment of duration may be a value obtained by multiplying a difference between a value obtained by performing a ceiling operation on a value obtained by dividing the duration of the non-legacy physical layer frame after the legacy signaling field by the duration of a symbol of the legacy physical layer frame and the value obtained by dividing the duration of the non-legacy physical layer frame after the legacy signaling field by the duration of a symbol of the legacy physical layer frame by the duration of a symbol of the legacy physical layer frame.

The processor may be configured to determine a format of a non-legacy signaling field included in the non-legacy physical layer frame based on the length information.

The processor may be configured to determine the non-legacy physical layer frame comprises a predetermined signaling field based on the length information.

The processor may be configured to obtain the information other than the information on the duration of the non-legacy physical layer frame based on the remaining value and a modulation method of a third symbol after the legacy signaling field.

The modulation method may be Binary Phase Shift Keying (BPSK) or Quadrature Binary Phase Shift Keying (QBPSK).

According to an embodiment of the present invention, an operation method of a wireless communication terminal that communicates wirelessly, the method includes: receiving a non-legacy physical layer frame by using the transceiver and obtains a legacy signaling field including information decodable by a legacy wireless communication terminal from the non-legacy physical layer frame, obtaining length information indicating information on a duration of the non-legacy physical layer frame after a legacy signaling field, from the legacy signaling field, obtaining information other than the information on the duration of the non-legacy physical layer frame through a remaining value obtained by dividing the length information by a data size transmittable by a symbol of a legacy physical layer frame, wherein the data size transmittable by a symbol of the legacy physical layer frame is 3 octets when a data rate of the legacy physical layer frame is 6 Mbps, and determining the number of symbols of the data of the non-legacy physical layer frame according to a following equation, $$N_{SYM} \left\lfloor \left( \frac{L\_LENGTH + m + 3}{3} \right) \times 4 - T_{HE\_PREAMBLE} \right) \Big/ T_{SYM} \right\rfloor - b_{PE\_Disambiguity}$$

where $\lfloor x \rfloor$ denotes a largest integer less than or equal to x,
L_LENGTH denotes the length information,
m denotes a value obtained by subtracting the remaining value from the data size transmittable by a symbol of the legacy physical layer frame,
$b_{PE\_Disambiguity}$ denotes a value of PE Disambiguity field,
$T_{HE\_PREAMBLE}$ denotes a duration of non-legacy preamble of the non-legacy physical layer frame,
$T_{SYM}$ denotes a duration of a symbol of the data of the non-legacy physical layer frame.

The PE Disambiguity field may be set based on the duration of a symbol of the data of the non-legacy physical layer frame and an increment of duration to set a value of the length information based on a duration of a symbol of legacy physical layer frame.

The method may further include obtaining a duration of a packet extension which is a padding of the non-legacy physical layer frame, according to a following equation, $$T_{PE}\left[\frac{\left(\left\lceil\frac{L\_LENGTH+m+3}{3}\right\rceil \times 4 - T_{HE\_PREAMBLE}\right) - N_{SYM} \times T_{SYM}}{4}\right] \times 4$$

where ⌈x⌉ denotes a largest integer less than or equal to x,
L_LENGTH denotes the length information,
m denotes the value obtained by subtracting the remaining value from the data size transmittable by a symbol of the legacy physical layer frame,
$T_{HE\_PREAMBLE}$ denotes the duration of non-legacy preamble of the non-legacy physical layer frame,
$T_{SYM}$ denotes the duration of a symbol of the data of the non-legacy physical layer frame.

The increment of duration may be a value obtained by multiplying a difference between a value obtained by performing a ceiling operation on a value obtained by dividing the duration of the non-legacy physical layer frame after the legacy signaling field by the duration of a symbol of the legacy physical layer frame and the value obtained by dividing the duration of the non-legacy physical layer frame after the legacy signaling field by the duration of a symbol of the legacy physical layer frame by the duration of a symbol of the legacy physical layer frame.

The method may further include determining a format of a non-legacy signaling field included in the non-legacy physical layer frame based on the length information.

The determining the format of a non-legacy signaling field included in the non-legacy physical layer frame may include determining the non-legacy physical layer frame comprises a predetermined signaling field based on the length information.

The obtaining the information other than the information on the duration of the non-legacy physical layer frame may include obtaining the information other than the information on the duration of the non-legacy physical layer frame based on the remaining value and a modulation method of a third symbol after the legacy signaling field.

The modulation method may be Binary Phase Shift Keying (BPSK) or Quadrature Binary Phase Shift Keying (QBPSK).

Advantageous Effects

An embodiment of the present invention is to provide an efficient wireless communication method and wireless communication terminal.

Especially, an embodiment of the present invention provides an efficient wireless communication method and wireless communication terminal in a wireless communication environment in which a legacy wireless communication terminal and a non-legacy wireless communication terminal coexist.

DESCRIPTION OF DRAWINGS

FIG. 24 shows an equation for obtaining length information included in L-SIG by a wireless communication terminal according to an embodiment of the present invention.

FIG. 25 shows a method of a wireless communication terminal to determine whether the existence of a packet extension is unclear according to an embodiment of the present invention.

FIG. 26 shows a method of determining the length of a packet extension by a wireless communication terminal according to an embodiment of the present invention.

FIG. 27 shows that a legacy wireless communication terminal obtains the duration of a non-legacy physical layer frame based on L_LENGTH according to an embodiment of the present invention.

FIG. 28 shows that a wireless communication terminal according to an embodiment of the present invention adds a predetermined integer according to the format of a non-legacy signaling field while setting L_LENGTH.

FIG. 29 shows a method for determining the length of a packet extension by a wireless communication terminal according to an embodiment of the present invention when adding a predetermined integer according to the format of a non-legacy signaling field while setting L_LENGTH.

FIG. 30 shows that a wireless communication terminal according to an embodiment of the present invention subtracts a predetermined integer according to the format of a non-legacy signaling field while setting L_LENGTH.

FIG. 31 shows a method for determining the length of a packet extension by a wireless communication terminal according to an embodiment of the present invention when adding a predetermined integer according to the format of a non-legacy signaling field while setting L_LENGTH.

MODE FOR CARRYING OUT THE INVENTION

Figure 1:
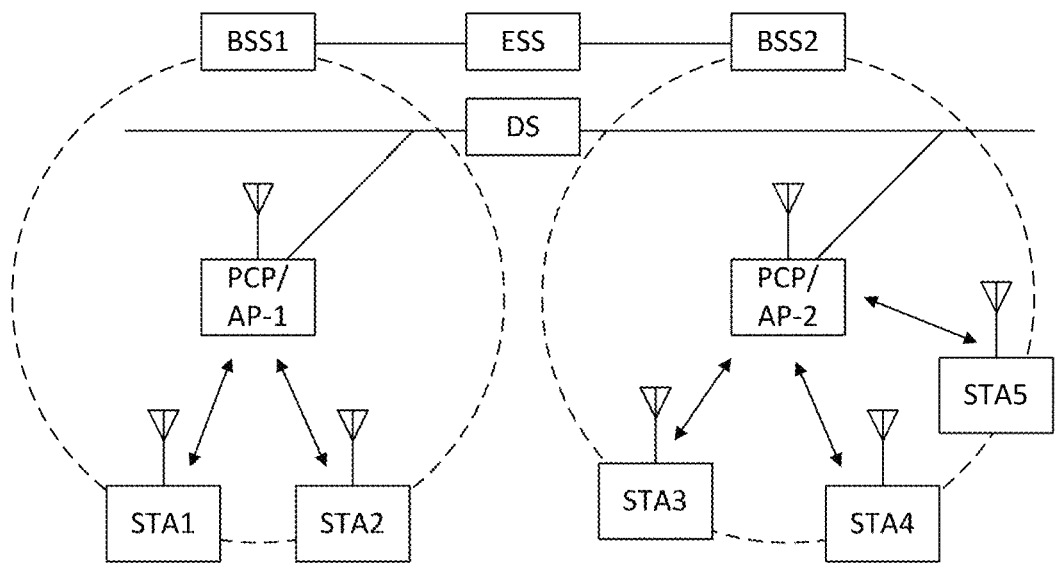
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0092525, and Nos. 10-2105-0117434 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
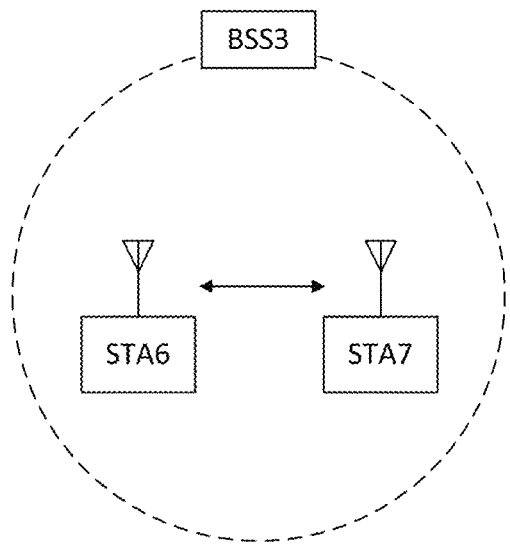
FIG. 2 is a view illustrating a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
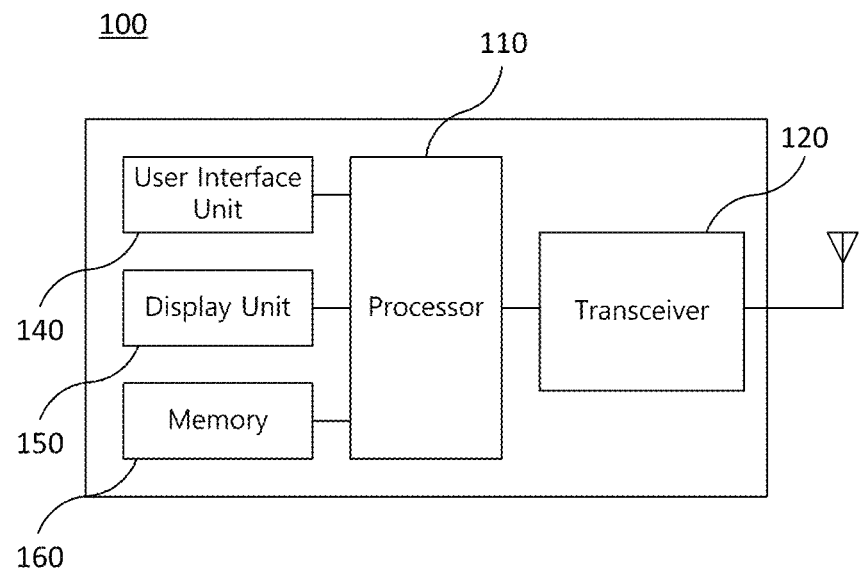
FIG. 3 is a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
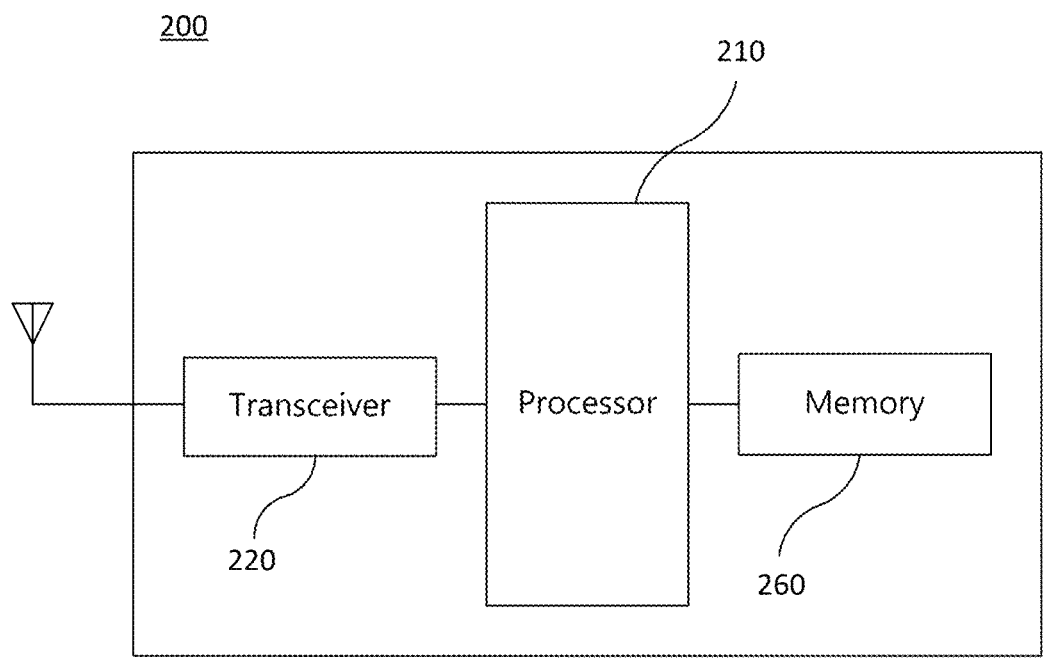
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
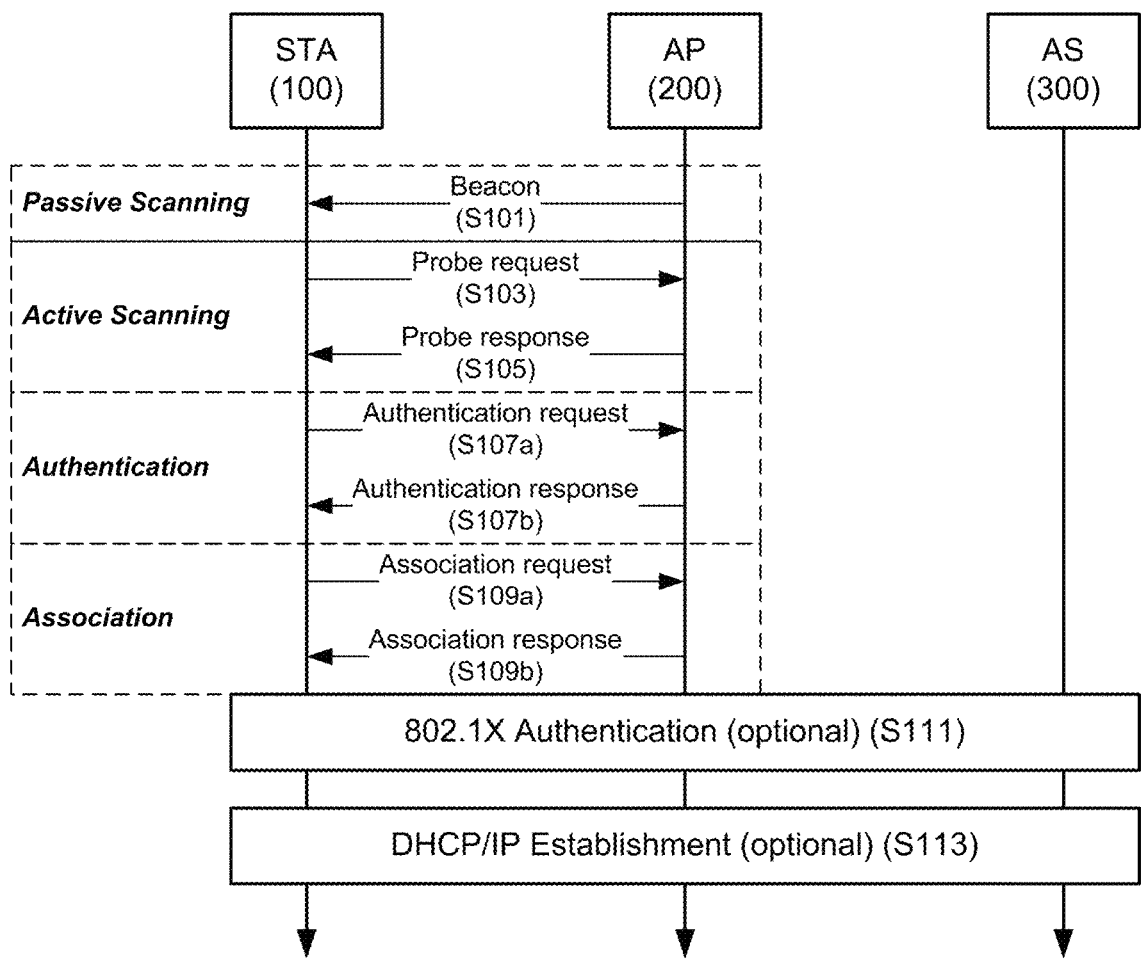
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When changing the physical layer frame format of a wireless signal conventionally used to enhance the performance of wireless communication, coexistence with a wireless communication terminal that does not support a formatted physical layer frame is a problem. At this time, the changed physical layer frame is referred to as a non-legacy physical layer frame, and an existing wireless communication terminal that does not support the changed physical layer frame is referred to as a legacy wireless communication terminal. Specifically, when a non-legacy wireless communication terminal transmits a non-legacy physical layer frame, a legacy wireless communication terminal that does not support non-legacy physical layer frames may not decode information on non-legacy physical layer frames. Therefore, the legacy wireless communication terminal may not know the length of the physical layer frame transmitted by the non-legacy wireless communication terminal, so that the legacy wireless communication terminal may indefinitely sense the channel. In addition, a transmission collision may occur between the legacy wireless communication terminal and the non-legacy wireless communication terminal, resulting in a decrease in transmission efficiency.

To solve this problem, the non-legacy wireless communication terminal may transmit signaling information decodable by a legacy wireless communication terminal through a physical layer frame. Signaling information decodable by a legacy wireless communication terminal, which is transmitted through a physical layer frame, is also referred to as L-SIG. At this time, after receiving the data value of the signal transmitted after L-SIG, the non-legacy wireless communication terminal may determine that the physical layer frame is a non-legacy physical layer frame. Thus, the efficiency that a non-legacy wireless communication terminal determines whether there is a non-legacy physical layer is low. Therefore, when the non-legacy physical layer frame includes L-SIG, a method for quickly determining whether there is a non-legacy physical layer frame by the non-legacy wireless communication terminal is needed. This will be described with reference to FIGS. 6 to 23.

Figure 6:
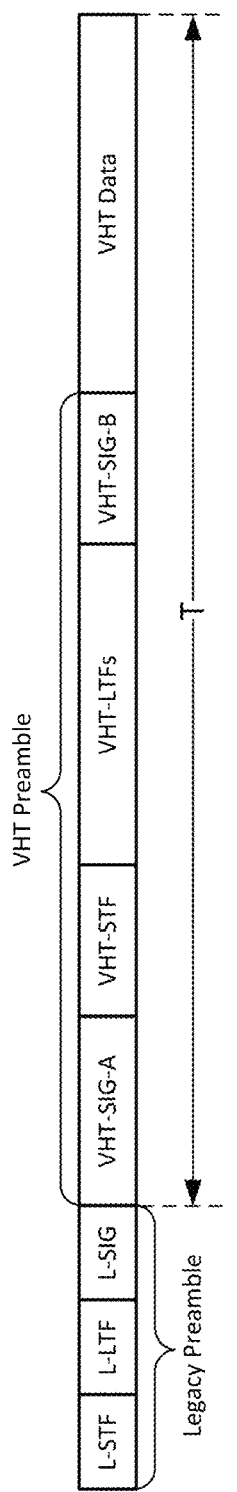
FIG. 6 shows a structure of an IEEE 802.11ac physical layer frame supporting a legacy wireless LAN mode.

FIG. 6 shows a structure of an IEEE 802.11ac physical layer frame supporting a legacy wireless LAN mode.

As shown in FIG. 6, the 11ac physical layer frame includes a legacy preamble, a Very High Throughput (VHT) preamble, and VHT data. The legacy preamble may be decoded in a legacy wireless communication terminal such as IEEE 802.11a (hereinafter referred to as 11a) wireless communication terminal and the 11a wireless communication terminal protects the 11ac physical layer frame based on information extracted from the legacy preamble. Meanwhile, the 11ac wireless communication terminal obtains length information indicating the length T of the physical layer frame from the legacy preamble of the 11ac physical layer frame. Therefore, the VHT preamble (for example, VHT-SIG) of the 11ac physical layer frame may not include the length information.

Figure 7:
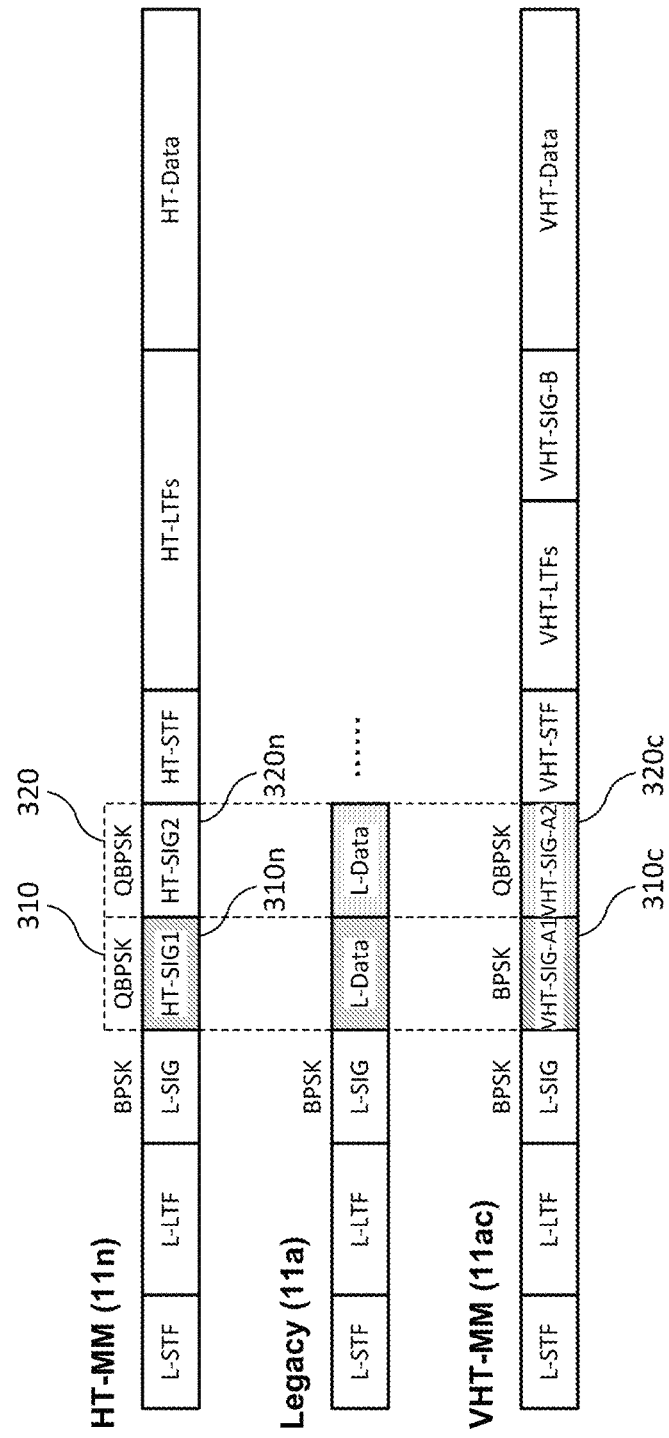
FIG. 7 shows a preamble structure of IEEE 802.11n, 11a and 11ac physical layer frames.

FIG. 7 shows a preamble structure of IEEE 802.11n, 11a and 11ac physical layer frames.

As in the embodiment of FIG. 7, the 11a physical layer frame includes a legacy preamble and legacy data (L-Data). The legacy preamble includes a legacy short training field (L-STF), a legacy long training field (L-LTF), and a legacy signal field (L-SIG), and among them, L-SIG is modulated using Binary Phase Shift Keying (BPSK). On the other hand, the 11n/ac packet includes a legacy preamble as in the 11a packet, and includes the recognizable information of the 11n/ac terminal as a separate preamble after the L-SIG (i.e., an HT preamble and a VHT preamble). The wireless communication terminal supporting 11a extracts rate information and length information included in the L-SIG of the physical layer frame. The wireless communication terminal supporting 11a regards a portion after L-SIG as legacy data L-Data and decodes the portion after L-SIG based on the rate information and length information. The legacy data L-Data is modulated using any one of BPSK, Quadrature Binary Phase Shift Keying (QPSK), 16-Quadrature Amplitude Modulation (QAM), and 64-QAM.

On the other hand, the physical layer frame in 11n may be distinguished from the physical layer frame in 11a (IEEE 802.11g physical layer frame in the case of a 2.4 GHz band) based on a modulation technique used for a High Throughput (HT) preamble after a legacy preamble. Referring to FIG. 7, initial symbols 310n and 320n constituting the HT-SIG (HT-SIG1 and HT-SIG2) of the HT preamble in the 11n physical layer frame are modulated through a modulation technique not used for 11a packets, that is, Quadrature Binary Phase Shift Keying (QBPSK). The wireless communication terminal supporting 11n identifies the modulation technique used for the first symbol 310 after the legacy preamble of the received physical layer frame. If the first symbol 310 is modulated with QBPSK, the wireless communication terminal supporting 11n recognizes that the corresponding physical layer frame is an 11n physical layer frame. The wireless communication terminal supporting 11n additionally checks whether the modulation technique of the QBPSK is used for the second symbol 320 after the legacy preamble of the physical layer frame, thereby increasing the reliability of physical layer frame identification.

Thus, the discrimination of the format of the physical layer frame based on the modulation technique used in the preamble of the physical layer frame by the wireless communication terminal is referred to as auto detection. The wireless communication terminal supporting 11n may use auto detection, and without the Cyclical Redundancy Check (CRC) for the HT-SIG of the physical layer frame, determine whether the corresponding physical layer frame is an 11n physical layer frame. Through auto detection, when the received physical layer frame is not an 11n physical layer frame, the wireless communication terminal supporting 11n may reduce power consumption due to an unnecessary decoding process. Also, through auto detection, the wireless communication terminal supporting 11n may reduce the data transmission/reception delay, for an example, a delay due to 11a fallback decision.

In a similar manner, the wireless communication terminal may distinguish the 11ac physical layer frame from the 11a physical layer frame and the 11n physical layer frame based on the modulation technique used for the VHT preamble after the legacy preamble. However, the preamble of the 11ac physical layer frame should minimize the influence on the auto detection process of the 11n terminal described above. That is, a modulation technique for preventing the 11n terminal from recognizing the physical layer frame as the 11n physical layer frame in the first symbol 310c after the legacy preamble may be used in the 11ac physical layer frame. Accordingly, referring to FIG. 7, the first symbol 310c after the legacy preamble in the 11ac physical layer frame is modulated with BPSK and the second symbol 320c is modulated with QBPSK, respectively. At this time, the first symbol 310c constitutes the VHT-SIG-A1 of the VHT preamble and the second symbol 320c constitutes the VHT-SIG-A2 of the VHT preamble.

Based on the modulation technique used for the first symbol 310 and the second symbol 320 after the legacy preamble of the received physical layer frame, the wireless communication terminal supporting 11ac determines whether the physical layer frame is an 11ac physical layer frame. Specifically, the wireless communication terminal supporting 11ac may distinguish the 11n physical layer frame from the non-11n physical layer frame based on the modulation technique used in the first symbol 310, and may distinguish the 11a physical layer frame and the 11ac physical layer frame from the non-11n physical layer frame based on the modulation technique used in the second symbol 310.

Figure 8:
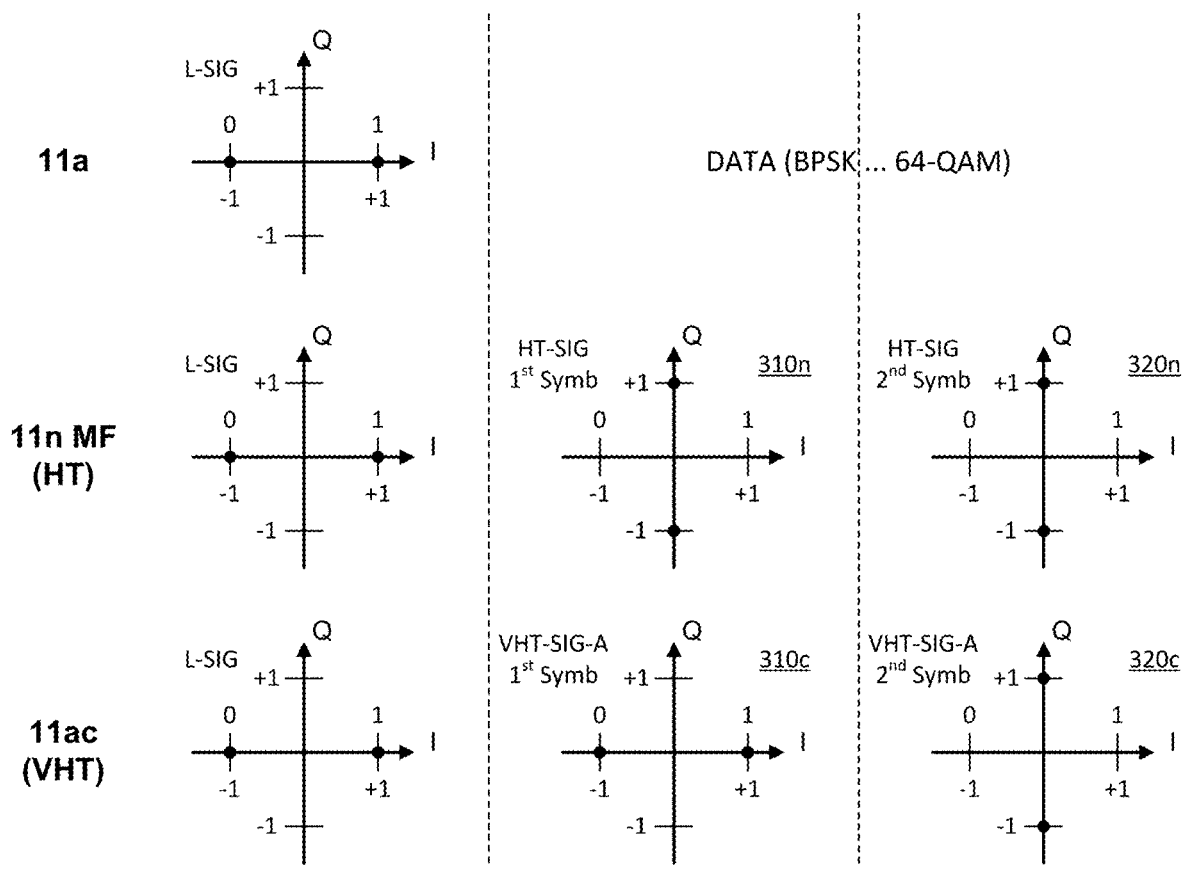
FIG. 8 shows a symbol specific modulation technique of L-SIG, HT-SIG, and VHT-SIG-A for auto detection between 802.11a/n/ac physical layer frames.

FIG. 8 shows a symbol specific modulation technique of L-SIG, HT-SIG, and VHT-SIG-A for auto detection between 802.11a/n/ac physical layer frames.

First, the L-SIGs of the 11a, 11n and 11ac physical layer frames are modulated with BPSK. The wireless communication terminal supporting 11a receives the physical layer frame and extracts the L-SIG of the physical layer frame. At this time, the wireless communication terminal supporting 11a regards symbols after L-SIG as data. Therefore, even when the wireless communication terminal supporting 11a receives the 11n physical layer frame or the 11ac physical layer frame, the wireless communication terminal supporting 11a recognizes the received physical layer frame as an 11a physical layer frame. The wireless communication terminal supporting 11a extracts the length information from the L-SIG of the received physical layer frame. The wireless communication terminal supporting 11a defers the transmission/reception operation by the time corresponding to the length information. Thus, the wireless communication terminal supporting 11a protects the received 11n physical layer frame or 11ac physical layer frame.

The HT-SIG, which is the first symbol 310n and the second symbol 320n after the L-SIG of the 11n physical layer frame, is modulated with QBPSK. The wireless communication terminal supporting 11n checks the modulation technique used for the first symbol after the legacy preamble of the received physical layer frame. When the first symbol is modulated with QBPSK, the wireless communication terminal supporting 11n determines that the physical layer frame is an 11n physical layer frame. At this time, the wireless communication terminal may determine the modulation technique through the distribution between the I/Q channels of the constellation points of subcarriers where each data transmission is performed. In addition, the wireless communication terminal supporting 11n may additionally confirm whether or not the modulation technique of QBPSK is used for the second symbol after the legacy preamble of the received physical layer frame. Thus, the wireless communication terminal supporting 11n may increase the reliability of 11n physical layer frame identification.

The first symbol 310c after the L-SIG of the 11ac physical layer frame is modulated with BPSK, and the second symbol 320c is modulated with QBPSK. Specifically, the first symbol 310c and the second symbol 320c of the VHT-SIG-A of the 11ac physical layer frame are modulated with BPSK and QBPSK, respectively. Based on the modulation technique used for the first symbol and the second symbol after the legacy preamble of the received physical layer frame, the wireless communication terminal supporting 11ac determines whether the corresponding physical layer frame is an 11ac physical layer frame. When the second symbol is modulation with QBPSK, the wireless communication terminal supporting 11ac should determine whether the corresponding physical layer frame is the 11n physical layer frame through the first symbol to clearly determine the format of the physical layer frame.

Figure 9:
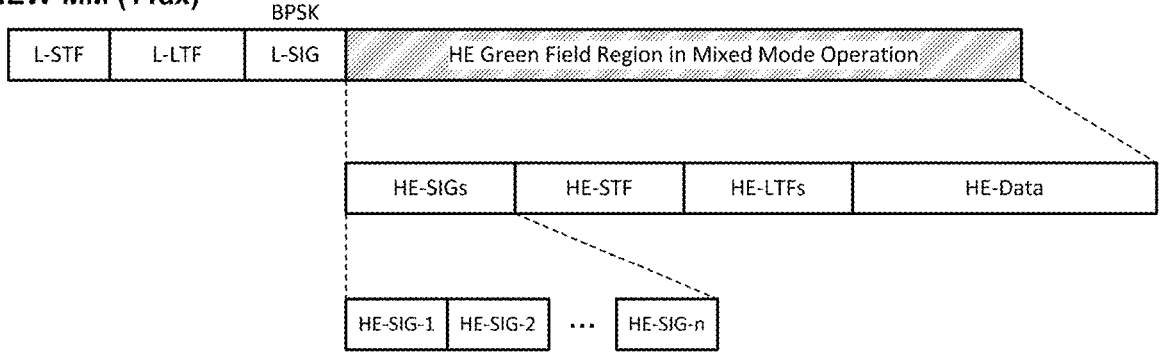
FIG. 9 shows a structure of an IEEE 802.11ax physical layer frame according to an embodiment of the present invention.

FIG. 9 shows a structure of an IEEE 802.11ax physical layer frame according to an embodiment of the present invention.

In an embodiment of the present invention, a non-legacy wireless LAN mode may represent an IEEE 802.11ax wireless LAN mode, and a legacy wireless LAN mode may represent a wireless LAN mode such as 11a, 11g, 11n, and 11ac, i.e., a legacy, compared to the 11ax. In addition, the format of the physical layer frame in the present invention may indicate information on the wireless LAN communication standard mode used in the physical layer frame. Specifically, the information on the wireless LAN communication standard mode may indicate information on a communication standard mode of IEEE 802.11a/g/n/ac/ax.

In the embodiment of FIG. 9, a non-legacy physical layer frame (i.e., 11ax physical layer frame) may be designed with a new physical layer frame structure decodable only by a non-legacy wireless communication terminal (such as an 11ax terminal).

As described above, the legacy preamble may include L-STF, L-LTF, and L-SIG for compatibility with a legacy terminal. The non-legacy physical layer frame may include a High Efficiency (HE) preamble and HE data after L-SIG. The HE preamble includes HE-SIGs consisting of at least one SIG (HE-SIG-1, HE-SIG-2, . . . , HE-SIG-n), HE-STF, and HE-LTFs for non-legacy wireless LAN operation. At this time, SIG refers to a signaling field indicating signaling information of a physical layer frame. Also, various arrangements such as the number and positions of HE-SIG/STF/LTF in the HE preamble are possible. In an embodiment of the present invention, the HE preamble may be referred to as a non-legacy preamble.

At this time, when the legacy physical layer frame and the non-legacy physical layer frame coexist, there is a need for an HE preamble structure in which a non-legacy wireless communication terminal may automatically detect information on a non-legacy physical layer frame while minimizing the influence on a legacy wireless communication terminal.

Figure 10:
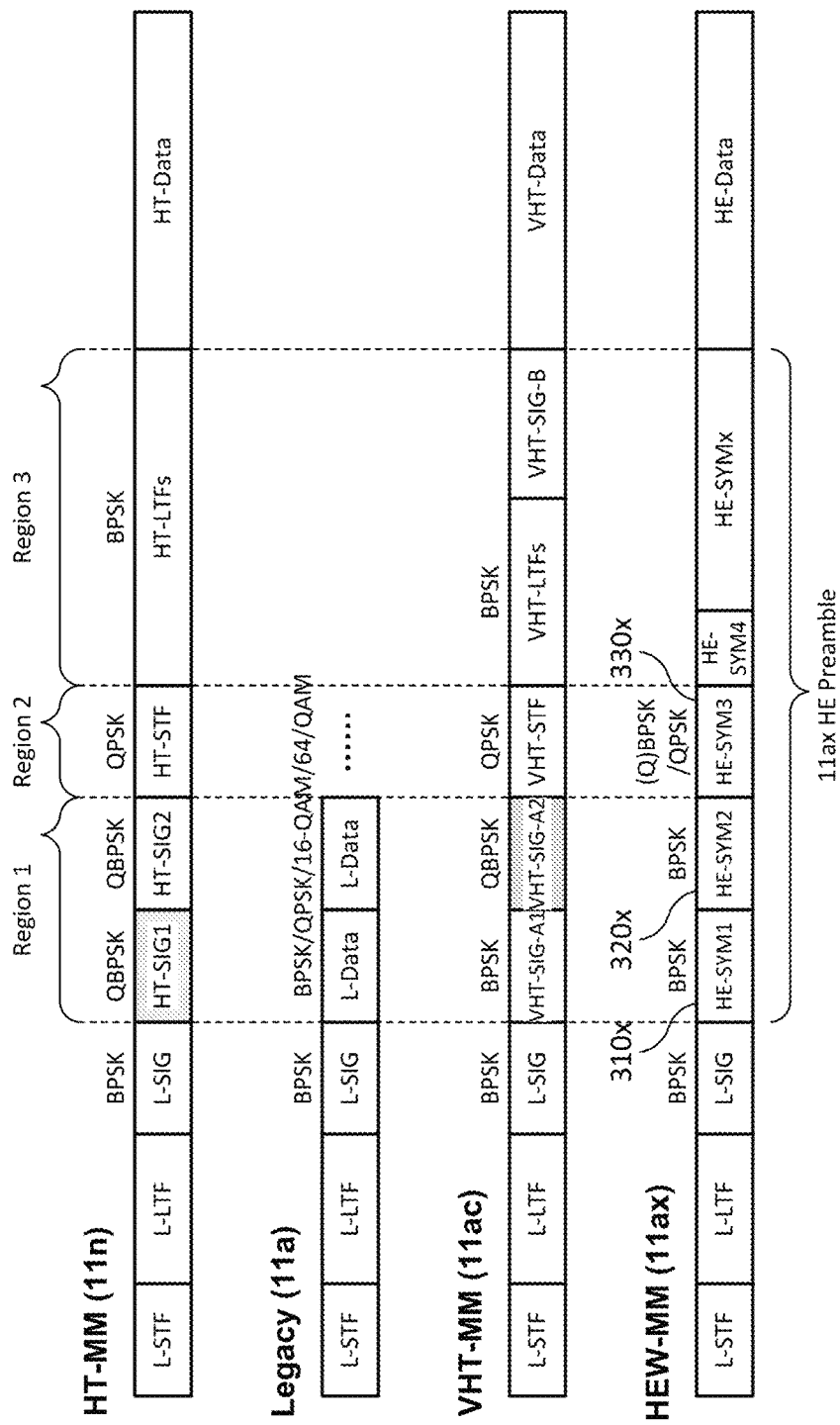
FIG. 10 shows the structures of a legacy physical layer frame and a non-legacy physical layer frame according to an embodiment of the present invention.

FIG. 10 shows the structures of a legacy physical layer frame and a non-legacy physical layer frame according to an embodiment of the present invention.

As described above, the legacy physical layer frame may include a physical layer frame of IEEE 802.11a/g/n/ac. In addition, a non-legacy physical layer frame may represent an IEEE 802.11ax physical layer frame.

The HE preamble of the non-legacy physical layer frame is composed of a plurality of symbols. In the present invention, a symbol indicates an Orthogonal Frequency Division Multiplexing (OFDM) symbol, and one symbol includes a valid OFDM symbol section and a guard interval section. In addition, in FIG. 10, one symbol of the preamble section may have a length of 4 us, but the present invention is not limited thereto, and the length of the symbol may vary depending on the kind of Discrete Fourier Transform (DFT) used. In an embodiment below, the first symbol after the L-SIG of the non-legacy physical layer frame is referred to as a first symbol 310x, the second symbol is referred to as a second symbol 320x, and the third symbol is referred to as a third symbol 330x. That is, the first symbol 310x, the second symbol 320x, and the third symbol 330x represent the first symbol, the second symbol, and the third symbol of the HE preamble, respectively.

In the embodiment of FIG. 10, the HE preamble may be divided into three regions Region 1, Region 2, and Region 3 based on the preambles of 11n and 11ac physical layer frames. First, the first region Region 1 is a first region after the L-SIG, and may include two symbols. In the first region, the 11a physical layer frame includes legacy data L-Data, the 11n physical layer frame includes HT-SIG, and the 11ac physical layer frame includes VHT-SIG. Accordingly, the wireless communication terminal demodulates the data in the first region of the 11a physical layer frame, and demodulates the HT-SIG and the VHT-SIG in the first region of the 11n physical layer frame and the 11ac physical layer frame. As described above, the legacy wireless communication terminal (11n and 11ac terminals) capable of auto detection may determine 11n and/or 11ac physical layer frames based on the modulation technique used in the symbols of the first region. Accordingly, the wireless legacy communication terminal demodulates the physical layer frame based on the format of the physical layer frame, i.e., the WLAN communication standard mode.

According to an embodiment of the present invention, the first symbol 310x and the second symbol 320x included in the first region in the non-legacy physical layer frame may be modulated with BPSK, respectively. Through this, the non-legacy physical layer frame may minimize the influence on the auto detection performance of the wireless communication terminal supporting 11n and the wireless communication terminal supporting 11ac, which are legacy wireless communication terminals. According to an embodiment of the present invention, BPSK modulation may be used for all the subcarriers of the first symbol 310x and the second symbol 320x, but a modulation technique other than BPSK may be used for some subcarriers (e.g., subcarriers of an even/odd index). However, if another modulation technique is used in some subcarriers, since the auto detection performance of the 11n/ac wireless communication terminal may be degraded, it is possible to use another modulation technique only in the specified some ranges.

The second region Region 2 following the first region Region 1 may include at least one symbol. In the second region, the 11a physical layer frame includes legacy data L-Data, the 11n physical layer frame includes HT-STF, and the 11ac physical layer frame includes VHT-STF, respectively. Accordingly, in the second region of the 11a physical layer frame, the wireless communication terminal demodulates the data in the same manner as the first region, and in the second region of the 11n physical layer frame and the 11ac physical layer frame, detects the STF based on the repetition characteristics of the time domain signal. At this time, the symbols of the second region of the 11n physical layer frame and the 11ac physical layer frame are modulated with QPSK.

As in the above embodiment, when the symbols of the first region of the non-legacy physical layer frame, i.e., the first symbol 310x and the second symbol 320x, are modulated with BPSK, the wireless communication terminal supporting 11n and 11ac may determine the corresponding physical layer frame as a 11a physical layer frame. Therefore, the modulation technique used for the symbol of the second region of the physical layer frame has little effect on the auto detection process of the 11n terminal and the 11ac terminal. Therefore, according to an embodiment of the present invention, a variety of modulation techniques may be used for the symbol, i.e., the third symbol 330x, of the second region of the non-legacy physical layer frame. For example, modulation such as BPSK, QBPSK, or QPSK may be used for the third symbol 330x of the non-legacy physical layer frame. According to one embodiment, the third symbol 330x of the non-legacy physical layer frame may be modulated with QBPSK. In such a way, when QBPSK having orthogonal characteristics with respect to BPSK is used for the modulation of the third symbol 330x, the non-legacy physical layer frame may be distinguished from the 11a/g physical layer frame. At this time, the non-legacy terminal confirms that the first symbol, the second symbol, and the third symbol after the L-SIG of a received packet are modulated with BPSK, BPSK, and QBPSK, respectively, so that it may determine that the corresponding physical layer frame is a non-legacy physical layer frame. However, in an embodiment of the present invention, the auto detection method of the non-legacy wireless communication terminal is not limited thereto, and the non-legacy wireless communication terminal may auto-detect the non-legacy physical layer frame based on various embodiments.

The third region Region 3 represents the remaining preamble section after the second region Region 2. In the third region Region 3, the 11n physical layer frame includes HT-LTF and the 11ac physical layer frame includes VHT-LTF and VHT-SIG-B. The symbols in the third region are modulated with BPSK. According to one embodiment, the third symbol 330x of the non-legacy physical layer frame may be modulated with QBPSK. The non-legacy wireless communication terminal may auto-detect the corresponding physical layer frame based on the modulation technique used in the third region of the non-legacy physical layer frame. At this time, at least some of the modulation technique and the preamble structure of the first region and the second region of the non-legacy physical layer frame may be set to be the same as that of the legacy physical layer frame.

Figure 11:
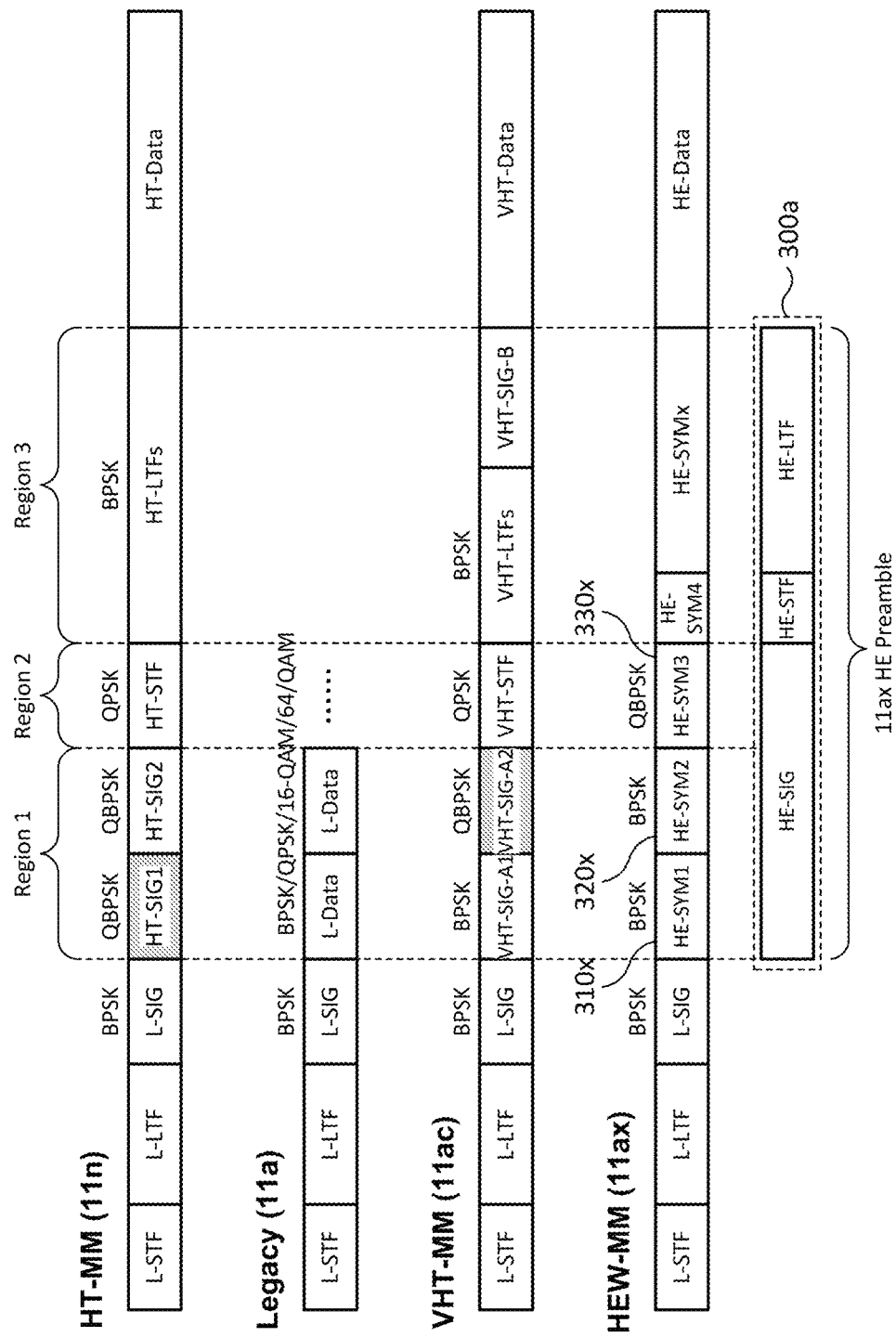
FIGS. 11 and 12 show structures of a preamble of a non-legacy physical layer frame according to an embodiment of the present invention.
Figure 12:
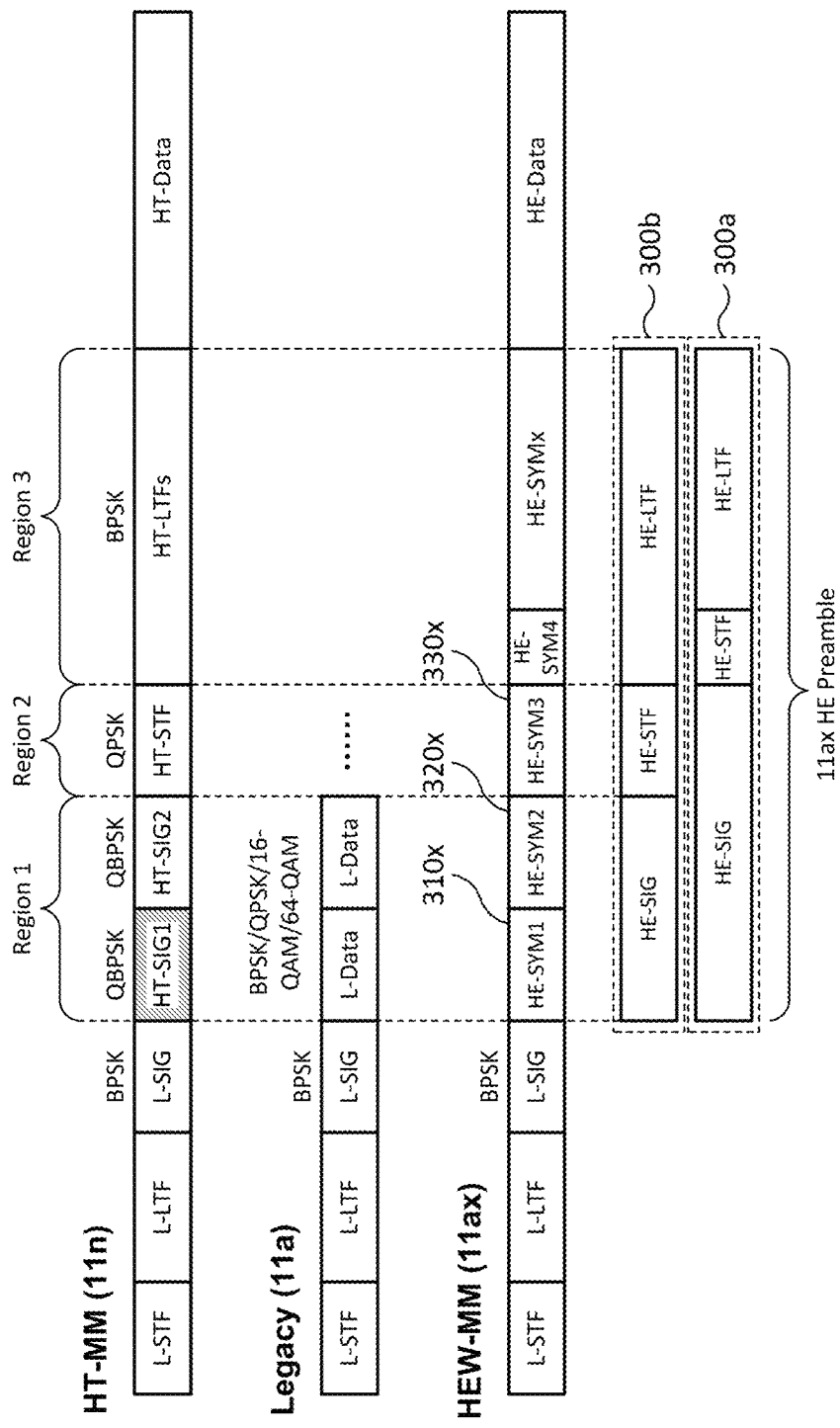
Figure 13:
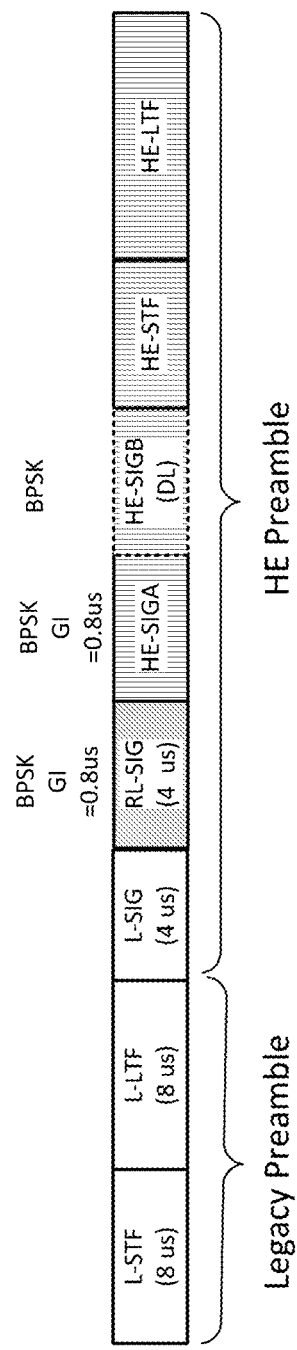
FIG. 13 shows a structure of a preamble of a non-legacy physical layer frame including a repeated L-SIG according to an embodiment of the present invention.

FIGS. 11 to 13 show structures of a preamble of a non-legacy physical layer frame according to an embodiment of the present invention.

In each of the embodiments of FIGS. 11 to 13, the same or corresponding parts as those of the embodiment of the previous drawings are not described.

FIG. 11 shows an embodiment of a preamble configuration of a non-legacy physical layer frame according to the present invention. Referring to FIG. 11, the non-legacy physical layer frame includes a legacy preamble and an HE preamble 300a. The HE preamble 300a includes a High Efficiency signal field (HE-SIG), a High Efficiency short training field (HE-STF), and a High Efficiency long training field (HE-LTF). In an embodiment of the present invention, the HE-SIG, the HE-STF, and the HE-LTF may be referred to as a non-legacy SIG, a non-legacy STF and a non-legacy LTF, respectively.

According to the basic structure of FIG. 11, the HE-SIG may include a first symbol 310x, a second symbol 320x, and a third symbol 330x. According to the embodiment of FIG. 11, the first symbol 310x and the second symbol 320x are modulated with BPSK, and the third symbol 330x is modulated with QBPSK. At this time, the non-legacy physical layer frame may be distinguished from the 11n physical layer frame through the first symbol 310x modulated with BPSK, and may be distinguished from the 11ac physical layer frame through the second symbol 320x modulated with BPSK. In addition, the non-legacy physical layer frame may be distinguished from the 11a/g physical layer frame through the third symbol 330x modulated with QBPSK. In such a way, the HE-SIG of the non-legacy physical layer frame may be composed of three or more symbols, and may further include an additional SIG if necessary.

FIG. 12 shows another embodiment of a preamble configuration of a non-legacy physical layer frame according to the present invention. According to another embodiment of the present invention, the HE-SIG of a non-legacy physical layer frame may have a variable length. However, FIG. 12 shows an HE preamble 300a having an HE-SIG composed of three symbols, and an HE preamble 300b having an HE-SIG composed of two symbols.

The HE-SIG may be set to a variable length according to various embodiments. As described later, the HE-SIG may be composed of a plurality of SIGs, and the HE-SIG length may vary depending on whether an additional SIG is included or not. Also, HE-SIG may have a variable length depending on the frequency band in which the corresponding physical layer frame is used. For example, the HE preamble 300b of the non-legacy physical layer frame in the first frequency band (e.g., the 2.4 GHz band) where no 11ac packet is transmitted may include an HE-SIG composed of two symbols 310x and 320x. According to an embodiment, the first symbol 310x constituting the HE-SIG of the HE preamble 300b may be modulated through BPSK and the second symbol 320x may be modulated through QBPSK. When the first symbol 310x and the second symbol 320x of the HE preamble 300b of the non-legacy physical layer frame are modulated in the same manner as those of the 11ac physical layer frame, the wireless communication terminal may determine the non-legacy physical layer frame using the same auto detection method of the 11ac physical layer frame in the first frequency band (2.4 GHz band). On the other hand, in the second frequency band (i.e., the 5 GHz band) in which the 11ac physical layer frame is transmitted, the HE-SIG of the HE preamble 300a of a non-legacy physical layer frame may further include an additional SIG composed of the third symbol 330x in the HE-SIG used in the HE preamble 300b in the first frequency band. At this time, the non-legacy wireless communication terminal may determine whether the non-legacy wireless communication terminal is a non-legacy physical layer frame through the modulation technique used in the third symbol 330x of the HE preamble 300a or the transmission data of the corresponding symbol. Meanwhile, the wireless communication terminal supporting the 11ac, which receives the HE preamble 300a of the non-legacy physical layer frame, may determine that the corresponding physical layer frame is not the 11ac physical layer frame through the error occurring in the decoding process of the VHT-SIG1.

Moreover, although it is shown in FIG. 12 that the length of the HE-SIG varies by two symbols or three symbols, the present invention is not limited thereto and the HE-SIG may be set to a length longer than that.

In order to improve the reliability of the non-legacy wireless communication terminal to auto-detect non-legacy physical layer frames, the non-legacy wireless communication terminal may transmit signaling information based on the L-SIG to the first symbol of the non-legacy signaling field of the non-legacy physical layer frame. At this time, the signaling information based on the L-SIG is referred to as RL-SIG. RL-SIG may be modulated by the same modulation method as L-SIG. RL-SIG may be the same signaling information as L-SIG. RL-SIG may be signaling information obtained by modifying at least one of the size and the phase of L-SIG. This will be described with reference to FIGS. 13 to 22.

FIG. 13 shows a structure of a preamble of a non-legacy physical layer frame including a repeated L-SIG according to an embodiment of the present invention.

As described above, RL-SIG may be the same signaling information as L-SIG. At this time, the non-legacy wireless communication terminal may modulate the RL-SIG with the same modulation method as the L-SIG. In this case, the non-legacy wireless communication terminal repeatedly transmits the same signal as the L-SIG. For example, the non-legacy wireless communication terminal may transmit the RL-SIG including the same signaling information as the L-SIG by modulating the first symbol of the non-legacy signaling field of the non-legacy physical layer frame with BPSK. At this time, the length of the RL-SIG symbol is 4 us.

In addition, the non-legacy wireless communication terminal may modulate the second symbol of the non-legacy signaling field with BPSK. Through the second symbol of the non-legacy signaling field, the legacy wireless communication terminal may distinguish the 11ac physical layer frame from the non-legacy physical layer frame. This will be described in detail with reference to FIG. 14.

Figure 14:
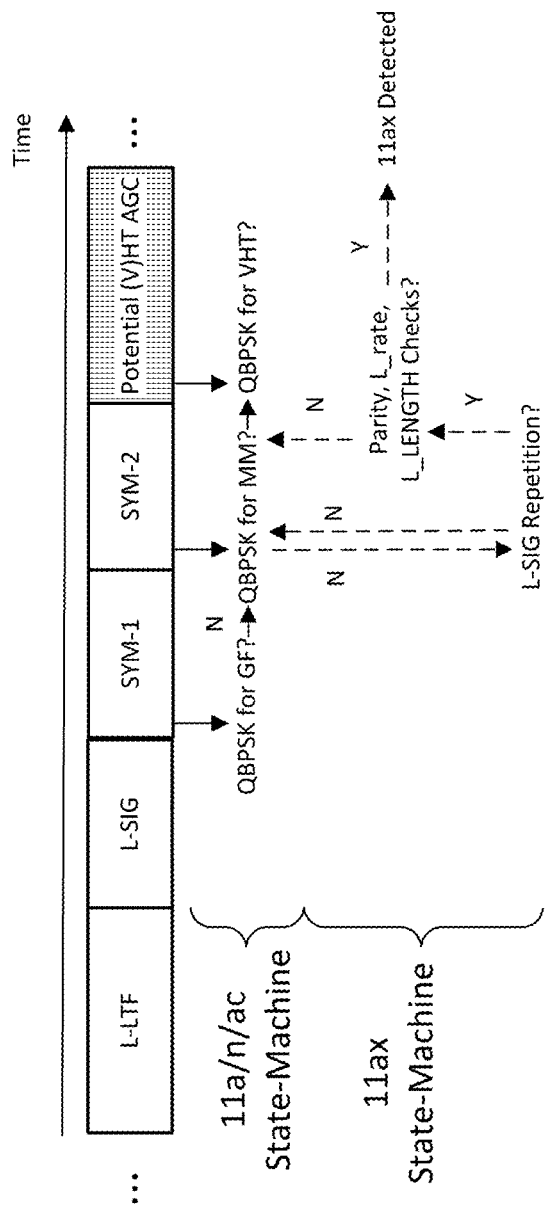
FIG. 14 shows an operation of auto-detecting a non-legacy physical layer frame including a repeated L-SIG by a wireless communication terminal according to an embodiment of the present invention.

FIG. 14 shows an operation of auto-detecting a non-legacy physical layer frame including a repeated L-SIG by a wireless communication terminal according to an embodiment of the present invention.

The wireless communication terminal determines whether the first symbol SYM-1 after L-SIG is modulated with QBPSK. When the first symbol SYM-1 after L-SIG is modulated with QBPSK, the wireless communication terminal determines the received physical layer frame as an 11n physical layer frame.

When the first symbol SYM-1 after L-SIG is modulated with BPSK, the wireless communication terminal determines whether the L-SIG is repeatedly transmitted and the second symbol SYM-2 after L-SIG is modulated with BPSK.

If the L-SIG is repeatedly transmitted and the second symbol SYM-2 after L-SIG is modulated with BPSK, the wireless communication terminal determines the validity of the information included in the L-SIG. Specifically, the wireless communication terminal may check the validity of at least one of the length information, the parity information, and the transmission rate information included in the L-SIG.

If the information included in the L-SIG is valid, the wireless communication terminal determines the received physical layer frame as a non-legacy physical layer frame.

In addition, non-legacy physical layer frames do not affect the auto detection of the legacy wireless communication terminal. Specifically, since the wireless communication terminal supporting 11a of the legacy wireless communication terminal may not decode the second symbol after the L-SIG of the non-legacy physical layer frame, it processes a signal after the L-SIG as an error.

Also, since the first symbol SYM-1 after the L-SIG of the non-legacy physical layer frame is not modulated with QBPSK, a wireless communication terminal supporting 11n among legacy wireless communication terminals does not determine the non-legacy physical layer frame as the 11n physical layer frame.

Also, when the second symbol SYM-1 after the L-SIG of the non-legacy physical layer frame is modulated with QBPSK, a wireless communication terminal supporting 11ac among legacy wireless communication terminals does not determine the non-legacy physical layer frame as the 11ac physical layer frame.

Also, the legacy wireless communication terminal does not approach the frequency band in which the physical layer frame is transmitted based on the L-LENGTH included in the L-SIG.

The non-legacy wireless communication terminal may increase the detection speed of the physical layer frame and enhance the reliability of non-legacy physical layer frame detection by transmitting the RL-SIG. The RL-SIG does not affect the auto detection of legacy wireless communication terminals. However, when the RL-SIG is used only for auto detection, the wireless communication terminal must transmit symbols including no information each time a non-legacy physical layer frame is transmitted. Therefore, when using the RL-SIG, a method is needed for the wireless communication terminal to transmit additional information. This will be described with reference to FIGS. 15 to 22.

Figure 15:
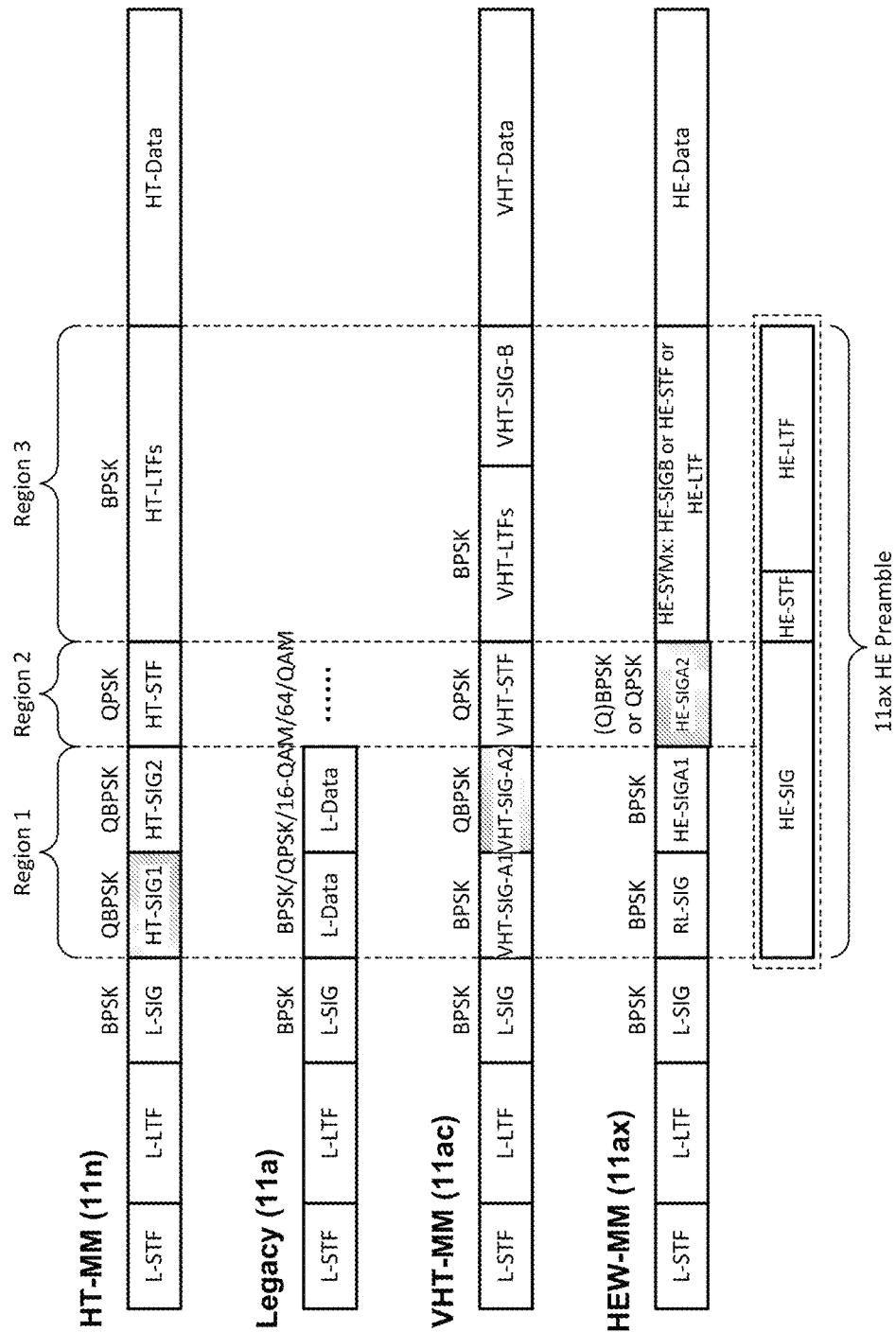
FIG. 15 shows that a non-legacy physical layer frame signals the format of a non-legacy physical layer frame according to an embodiment of the present invention.

FIG. 15 shows that a non-legacy physical layer frame signals the format of a non-legacy physical layer frame according to an embodiment of the present invention.

The wireless communication terminal may signal the format of the non-legacy physical layer frame through the modulation method of the third symbol after the L-SIG of the non-legacy physical layer frame. Specifically, the modulation method of the third symbol after L-SIG may indicate the format of the non-legacy signaling field. For example, the HE-SIG B field for signaling information for each of the plurality of wireless communication terminals of FIG. 15 may not be transmitted according to the transmission mode. Therefore, the modulation method of the third symbol after L-SIG may indicate whether the HE-SIG B field is transmitted. In yet another specific embodiment, the modulation method of the third symbol after L-SIG may represent the format of HE-SIG A.

At this time, the wireless communication terminal may signal the format of the non-legacy physical layer frame by modulating the third symbol after the L-SIG of the non-legacy physical layer frame with QBPSK. In a specific embodiment, the wireless communication terminal may signal the format of a non-legacy physical layer frame for long range transmission by modulating the third symbol after L-SIG with QBPSK.

In yet another specific embodiment, the wireless communication terminal may signal the format of the non-legacy physical layer frame by modulating the third symbol after the L-SIG of the non-legacy physical layer frame with QPSK. When the wireless communication terminal modulates the third symbol after the L-SIG with QPSK, the capacity of transmission information per symbol becomes large, so that the wireless communication terminal may increase the information transmission efficiency.

The wireless communication terminal may signal additional information through the RL-SIG when modifying the signal characteristics of the L-SIG to generate the RL-SIG. Specifically, the wireless communication terminal may generate RL-SIG by modifying at least one of the magnitude and the phase of a signal representing L-SIG. This will be described with reference to FIGS. 16 to 22.

Figure 16:
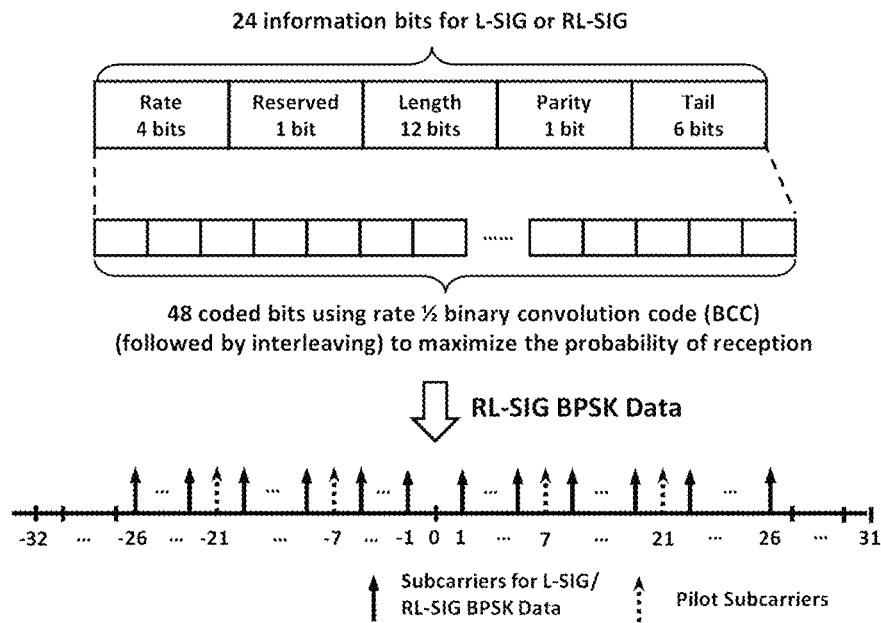
FIG. 16 shows data sub-carriers and pilot sub-carriers of L-SIG according to an embodiment of the present invention.

FIG. 16 shows data sub-carriers and pilot sub-carriers of L-SIG according to an embodiment of the present invention.

The L-SIG includes a total of 24-bit fields such as an L_RATE field indicating a transmission rate, an L_LENGTH field indicating a length of a physical layer frame after L_SIG, a Parity field for error checking, a Tail field, and Reserved Bits. The wireless communication terminal generates a 48-bit code bit through a ½ rate BCC technique. Such a 48-bit code bit may be composed of 48 BPSK modulation data. The wireless communication terminal transmits 48 BPSK modulation data in one OFDM symbol through 48 subcarriers. At this time, channel estimation is necessary for demodulation of code bits. Therefore, the wireless communication terminal transmits the pilot signal for channel estimation through four subcarriers. At this time, the pilot subcarriers are referred to as pilot subcarriers, and the subcarriers for transmitting data are referred to as data subcarriers. The positions of the pilot subcarriers of the L-SIG are index values −21, −7, 7, and 21.

The wireless communication terminal may transmit the same signal as the signal including the L-SIG as the signal including the RL-SIG. For convenience of explanation, a signal including L-SIG is referred to as an L-SIG signal, and a signal including RL-SIG is referred to as RL-SIG. At this time, the wireless communication terminal may transmit the RL-SIG by changing the position of the pilot subcarrier of the RL-SIG signal to be different from the position of the pilot subcarrier of the L-SIG signal. Therefore, the wireless communication terminal may signal information through the location of the pilot subcarrier of the RL-SIG. This will be described again with reference to FIG. 22.

Figure 17:
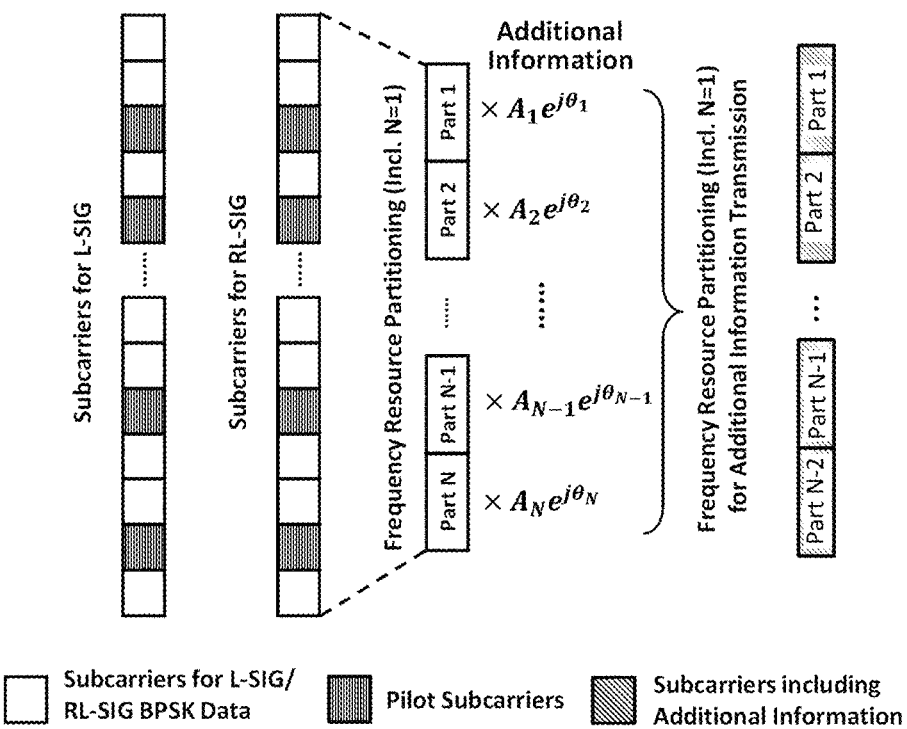
FIG. 17 shows an RL-SIG signaling information through a signal characteristic of a frequency region divided into a plurality of sections according to an embodiment of the present invention.

FIG. 17 shows an RL-SIG signaling information through a signal characteristic of a frequency region divided into a plurality of sections according to an embodiment of the present invention.

The wireless communication terminal may generate the RL-SIG by modifying at least one of L-SIG data, the locations of the pilot subcarriers and number of the pilot subcarriers. However, the wireless communication terminal receiving the non-legacy physical layer frame should be able to determine that the RL-SIG is the signaling information generated based on the L-SIG. Therefore, information should be transmitted without degrading the signal characteristics of the L-SIG.

In a specific embodiment, the wireless communication terminal may signal information based on a modification in one or more frequency section specific signals that the RL-SIG includes with respect to one or more frequency section specific signals, which is included in the L-SIG. At this time, the modification of the signal may indicate at least one of shifting the phase of the signal and changing the amplitude of the signal. For this, the wireless communication terminal divides the L-SIG signal into a plurality of frequency sections Part_i and shifts theta_i the phase of a signal in at least any one section among the plurality of divided frequency sections to generate RL-SIG. In addition, the wireless communication terminal may change A_i the magnitude of a signal in at least any one section among the plurality of divided frequency sections to generate RL-SIG.

At this time, the wireless communication terminal may shift to allow a phase value of a frequency section specific signal of RL-SIG to have 0 or 180 degrees. If the phase section specific signal phase value is 0 or 180 degrees (when the frequency section specific signal is multiplied by +1 or −1), it is modulated with BPSK. Therefore, frequency section specific phase shift of RL-SIG signal does not affect auto detection of 11n or 11ac. Specifically, the wireless communication terminal supporting 11n or 11ac determines whether it is the 11n physical layer frame or the 11ac physical layer frame according to whether the modulation method after L-SIG is BPSK or QBPSK. If the phase shift of the frequency section specific signal is 0 or 180 degrees in RL-SIG, the wireless communication terminal supporting 11n or 11ac determines that the modulation method after L-SIG is BPSK. Therefore, it does not affect the auto detection operation of the wireless communication terminal supporting 11n or 11ac. If the wireless communication terminal applies a phase shift of 0 or 180 degrees to each frequency section of the RL-SIG signal, the wireless communication terminal may transmit at least 1 bit of additional information through the RL-SIG signal.

When the wireless communication terminal transmits information based on a modification of a plurality of frequency section specific signals included in the RL-SIG with respect to a plurality of frequency section specific signals included in the L-SIG, the operation of detecting the RL-SIG by the wireless communication terminal receiving the non-legacy physical layer frame should be modified. This will be described with reference to FIG. 18.

Figure 18:
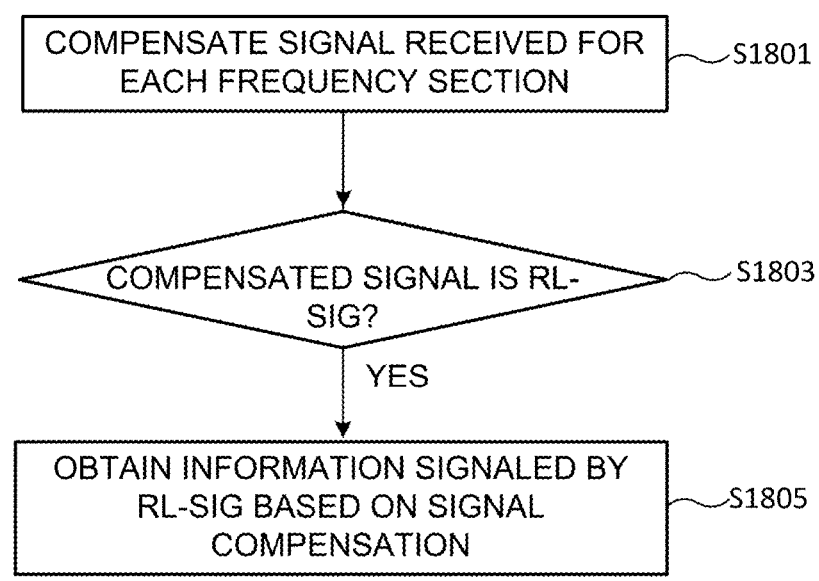
FIG. 18 shows an operation of detecting RL-SIG by a wireless communication terminal according to an embodiment of the present invention.

FIG. 18 shows an operation of detecting RL-SIG by a wireless communication terminal according to an embodiment of the present invention.

The wireless communication terminal may compensate for the the signal modification by performing each frequency section of the received signal to determine whether the received signal is an RL-SIG generated based on the L-SIG. Further, when the received signal is RL-SIG, the wireless communication terminal may obtain additional information based on the compensation for the received signal. This is because the wireless communication terminal transmitting the RL SIG may change the size for each frequency section of the L-SIG signal or shifts the phase for each frequency section of the L-SIG signal, thereby generating the RL-SIG signal.

The wireless communication terminal compensates the received signal for each frequency section (S1801). Specifically, the wireless communication terminal may compensate for the changed size compared to the L-SIG for each frequency section of the received signal. In addition, the wireless communication terminal may compensate for the shifted phase compared to the L-SIG for each frequency section of the received signal. At this time, the wireless communication terminal may compensate for a changeable size or a shiftable phase size in order for information transmission. Specifically, the number of changeable sizes or the number of shiftable sizes for each frequency section of the L-SIG signal may be plural in order for generation of the RL-SIG signal. At this time, the wireless communication terminal may apply all the compensation for the applicable signal modification to each frequency section.

For example, when applying the 0-degree or 180-degree phase shift to the L-SIG to generate the RL-SIG, the wireless communication terminal multiplies a value selected by 1-bit information of +1 or −1 by each frequency section of an L-SIG signal. At this time, the wireless communication terminal receiving the signal may compensate the signal by multiplying +1 or multiplying by −1 for each frequency section. For this, the range of a phase shift of the signal for the wireless communication terminal to signal information through the RL-SIG may be predetermined. In addition, the range of a changeable signal magnitude for the wireless communication terminal to signal information through the RL-SIG may be predetermined.

The wireless communication terminal compares the compensated signal with L-SIG and determines whether the received signal is RL-SIG (S1803). Specifically, when the compensated signal is equal to L-SIG, the wireless communication terminal may determine the received signal as RL-SIG. As described above, the number of sizes of a shiftable phase may be plural or the magnitude of a changeable signal may be plural. In addition, the wireless communication terminal may apply all the compensation for an available signal modification to each frequency section. At this time, the wireless communication terminal may determine which compensation method among applied compensation methods is identical to the L-SIG signal of the corresponding frequency section. For example, when applying the 0-degree or 180-degree phase shift to the L-SIG to generate the RL-SIG, the wireless communication terminal multiplies a value selected by 1-bit information of +1 or −1 by each frequency section of an L-SIG signal. At this time, the wireless communication terminal receiving the signal may multiply each frequency section by +1 to compensate the signal, and then compare the compensated signal with the signal of the corresponding frequency section of the L-SIG signal. In addition, the wireless communication terminal receiving the signal may multiply each frequency section by −1 to compensate the signal, and then compare the compensated signal with the signal of the corresponding frequency section of the L-SIG signal.

When the wireless communication terminal determined that the received signal is RL-SIG, the wireless communication terminal obtains signaling information of the RL-SIG based on the signal compensation (S1805). At this time, the wireless communication terminal may obtain the signaling information of the RL-SIG based on at least one of a magnitude change of a frequency section specific signal and a phase shift of a signal. Specifically, the wireless communication terminal may obtain the signaling information of the RL-SIG based on a value used for frequency section specific signal compensation. In a specific embodiment, the wireless communication terminal may obtain the signaling information of the RL-SIG based on a signal magnitude used for frequency section specific signal compensation. For example, the signal magnitude used for section specific signal compensation may indicate the value of the signaling information of the RL-SIG. In another specific embodiment, the wireless communication terminal may obtain the signaling information of the RL-SIG based on a phase shift value of a signal used for frequency section specific signal compensation. For example, the phase shift value of the signal used for section specific signal compensation may indicate the value of the signaling information of the RL-SIG.

When the wireless communication terminal does not determine that the received signal is not the RL-SIG, the wireless communication terminal determines the received signal as a legacy packet. At this time, the wireless communication terminal starts an operation for detecting a legacy packet from the received signal.

As described above, the RL-SIG may be identical to the entire L-SIG in the time domain. In another specific embodiment, the RL-SIG may include only a portion of the L-SIG signal in the time domain. In another specific embodiment, the wireless communication terminal divides the L-SIG, in a time domain, into a plurality of sections having the same size or a size having a rational number multiplication relationship, and changes at least one of size and phase for each time section to generate RL-SIG. At this time, the wireless communication terminal may divide the L-SIG into a plurality of time sections in consideration of CP/GI. The generation of the RL-SIG by modifying the L-SIG signal for each time section will be described with reference to FIG. 19.

Figure 19:
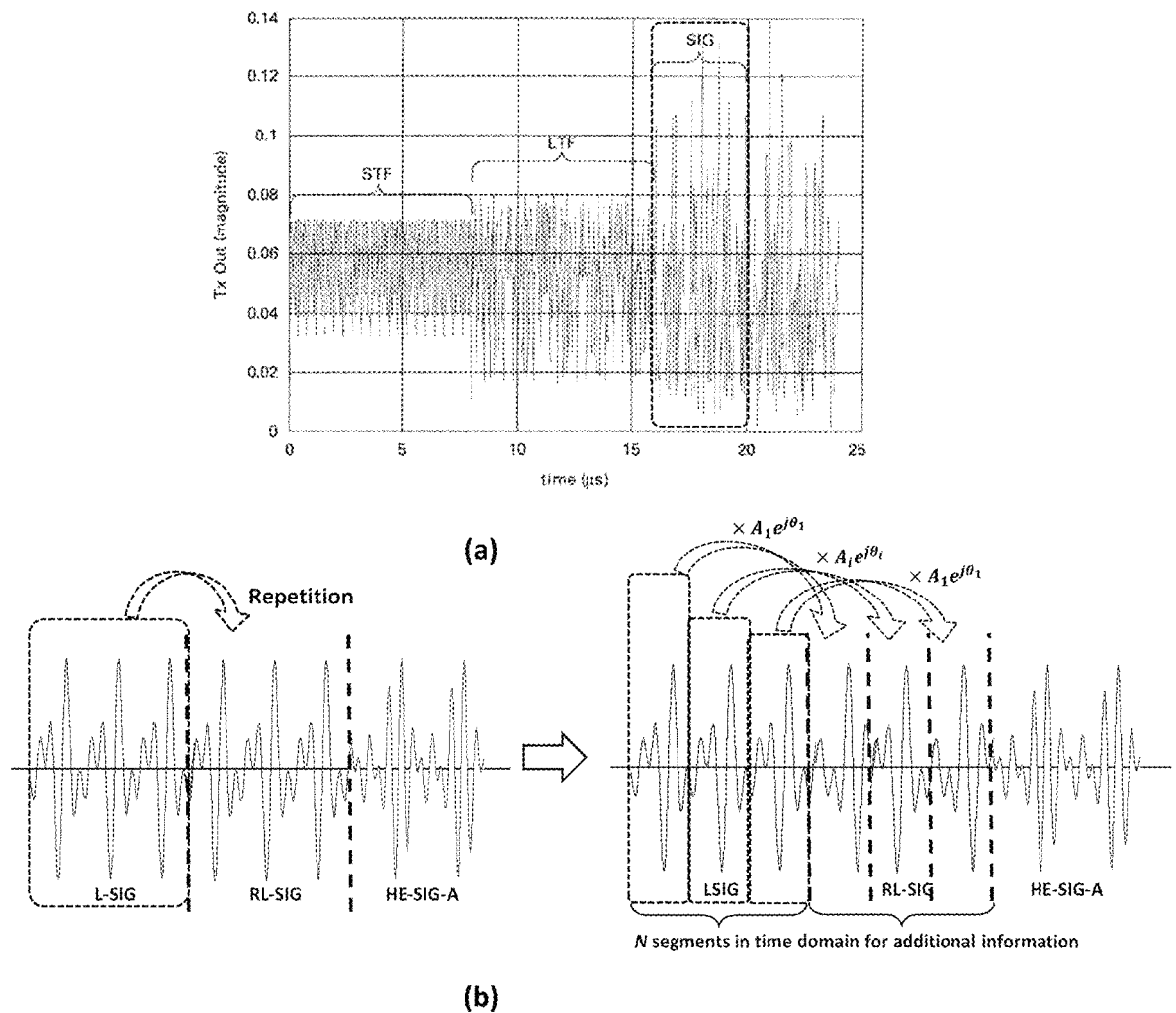
FIG. 19 shows an RL-SIG signaling information through a signal characteristic of a time region divided into a plurality of sections according to an embodiment of the present invention.

FIG. 19 shows an RL-SIG signaling information through a signal characteristic of a time domain divided into a plurality of sections according to an embodiment of the present invention. FIG. 19(*a*) shows a preamble signal of a physical layer frame transmitted by a wireless communication terminal in a time domain. FIG. 19(*b*) shows that RL-SIG is generated by dividing an L-SIG signal into a plurality of time sections and changing the phase of the L-SIG signal and the magnitude of the L-SIG signal in each of the plurality of time sections.

Specifically, the wireless communication terminal may signal information based on a modification in one or more frequency section specific signals that the RL-SIG includes with respect to one or more time section specific signals, which is included in the L-SIG. At this time, the modification of the signal may indicate at least one of shifting the phase of the signal and changing the amplitude of the signal. For this, the wireless communication terminal divides the L-SIG signal into a plurality of time sections and shifts the phase theta_i of a signal in at least any one section among the plurality of divided time sections to generate RL-SIG. In addition, the wireless communication terminal may change the magnitude A_i of a signal in at least any one section among the plurality of divided time sections to generate RL-SIG.

When the wireless communication terminal signals information based on a modification of a plurality of time section specific signals included in the RL-SIG with respect to a plurality of time section specific signals included in the L-SIG, the operation of detecting the RL-SIG by the wireless communication terminal receiving the non-legacy physical layer frame should be changed.

At this time, the wireless communication terminal may compensate for the signal modification by performing each time section of the received signal to determine whether the received signal is an RL-SIG generated based on the L-SIG.

Specifically, the wireless communication terminal may compensate for the changed size compared to the L-SIG for each time section of the received signal. In addition, the wireless communication terminal may compensate for the shifted phase compared to the L-SIG for each time section of the received signal. At this time, the wireless communication terminal may compensate for a changeable size or a shiftable phase size in order for information transmission. Specifically, the number of changeable sizes or the number of shiftable sizes for each time section of the L-SIG signal may be plural in order for generation of the RL-SIG signal. At this time, the wireless communication terminal may apply all the compensation for the applicable signal modification to each time section.

For example, when the wireless communication terminal apply the 0-degree or 180-degree phase shift to the L-SIG to generate the RL-SIG, the wireless communication terminal multiplies a value selected by 1-bit information of +1 or −1 by each time section of an L-SIG signal. At this time, the wireless communication terminal receiving the signal may compensate the signal by multiplying +1 or multiplying by −1 for each time section. For this, the range of a phase shift of the signal for the wireless communication terminal to signal information through the RL-SIG may be predetermined. In addition, the range of a changeable signal magnitude for the wireless communication terminal to signal information through the RL-SIG may be predetermined. For this, the range of a phase shift of the signal for additional information may be predetermined in order for the wireless communication terminal to generate the RL-SIG including additional information transmission. In addition, the range of a changeable signal magnitude for the wireless communication terminal to generate RL-SIG may be predetermined. The wireless communication terminal compares the compensated signal with L-SIG and determines whether the received signal is RL-SIG. Specifically, if the compensated signal is equal to L-SIG, the wireless communication terminal may determine the received signal as RL-SIG. As described above, the number of sizes of a shiftable phase may be plural or the magnitude of a changeable signal may be plural. Accordingly, the wireless communication terminal may apply all the compensation for an available signal modification to each time section. At this time, the wireless communication terminal may determine whether the compensated signal is identical to the L-SIG signal of the corresponding time section according to the compensation method for each time section. For example, when the wireless communication terminal apply the 0-degree or 180-degree phase shift to the L-SIG to generate the RL-SIG, the wireless communication terminal multiplies a value selected by 1-bit information of +1 or −1 by each time section of an L-SIG signal. At this time, the wireless communication terminal receiving the signal may multiply each time section by +1 to compensate the signal, and then compare the compensated signal with the signal of the corresponding time section of the L-SIG signal. In addition, the wireless communication terminal receiving the signal may multiply each time section by −1 to compensate the signal, and then compare the compensated signal with the signal of the corresponding time section of the L-SIG signal.

When the wireless communication terminal determines that the received signal is RL-SIG, the wireless communication terminal obtains signaling information of the RL-SIG based on the signal compensation. At this time, the wireless communication terminal may obtain the signaling information of the RL-SIG based on at least one of a magnitude change of a time section specific signal and a phase shift of a signal. Specifically, the wireless communication terminal may obtain the signaling information of the RL-SIG based on a value used for time section specific signal compensation. In a specific embodiment, the wireless communication terminal may obtain the signaling information of the RL-SIG based on a signal magnitude used for time section specific signal compensation. For example, the signal magnitude used for section specific signal compensation may indicate the value of the signaling information of the RL-SIG. In another specific embodiment, the wireless communication terminal may obtain the signaling information of the RL-SIG based on a phase shift value of a signal used for time section specific signal compensation. For example, the phase shift value of the signal used for section specific signal compensation may indicate the value of the signaling information of the RL-SIG.

Figure 20:
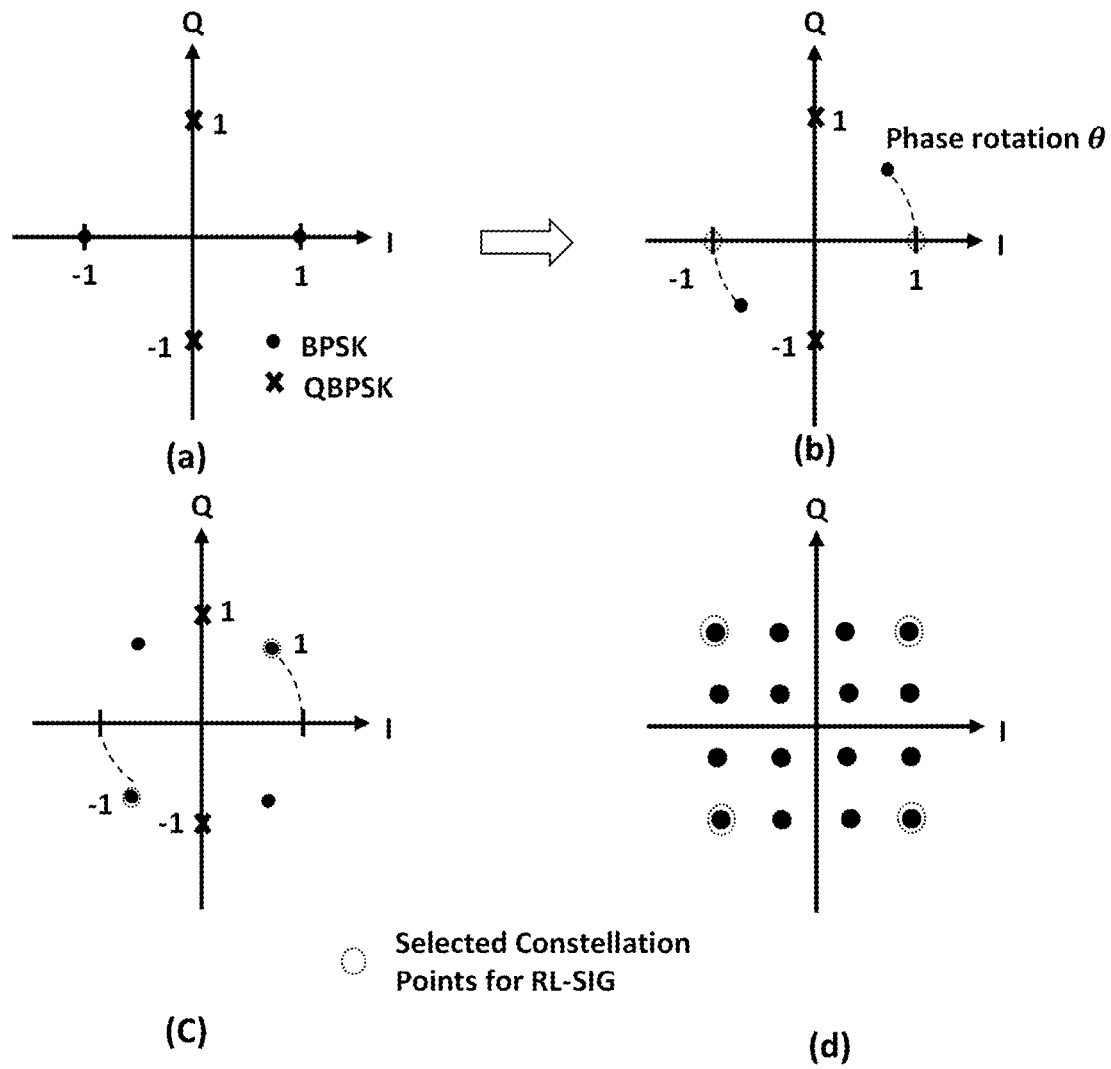
FIG. 20 shows an RL-SIG for transmitting information through a different modulation method different than L-SIG according to an embodiment of the present invention.

FIG. 20 shows an RL-SIG for transmitting information through a different modulation method different than L-SIG according to an embodiment of the present invention.

The wireless communication terminal may signal information through the RL-SIG modulation method. Specifically, the wireless communication terminal may modulate the RL-SIG using a different modulation method than a modulation method of the L-SIG.

However, it is not desirable for the wireless communication terminal to transmit RL-SIG with QBPSK to avoid confusion with VHT-SIG or HT-SIG. In addition, the wireless communication terminal may generate the RL-SIG by shifting the phase of the L-SIG signal modulated with BPSK. At this time, the wireless communication terminal may shift the phase of the L-SIG signal to distinguish the RL-SIG generated by shifting the phase from the QBPSK modulated signal. For example, the wireless communication terminal may shift the phase of the L-SIG signal by an angle other than 180 degrees. Since the phase of a signal modulated with BPSK and QBPSK has a difference of 90 degrees or 270 degrees as shown in FIG. 20(a), if the phase of the L-SIG signal modulated with BPSK is shifted by 90 degrees or 270 degrees, this is because the signal has the same format as the signal modulated with QBPSK. Therefore, the wireless communication terminal may generate the RL-SIG by shifting the phase of the L-SIG signal by 45 degrees or 135 degrees as shown in FIGS. 18(b), 18(c), and 18(d).

The 11a physical layer frame is modulated through any one method of BPSK/QPSK/16QAM/64QAM. Therefore, the wireless communication terminal may use four kinds of constellation points during RL-SIG modulation. For example, when 16QAM is selected as shown in FIG. 18(d), if the RL-SIG is configured through the corresponding constellation point, the information may be transmitted through the corresponding constellation selection. In other words, up to 2-bit information may be transmitted according to a specific constellation selection among BPSK/QPSK/16QAM/64QAM. Alternatively, the phase or magnitude of the signal corresponding to at least one of the four kinds of constellation points may be selected in advance and used as additional information transmission.

The wireless communication terminal may modulate the RL-SIG signal and the signal including the non-legacy signaling field after the RL-SIG through the same manner. Through this, the wireless communication terminal may prevent confusion between the non-legacy physical layer frame and the 11ac physical layer frame.

In another specific embodiment, the RL-SIG may be modulated with BPSK and the non-legacy signaling field after RL-SIG may be modulated with QPSK. In such a case, the wireless communication terminal may increase the information capacity of the non-legacy signaling field and prevent confusion between the non-legacy physical layer frame and the 11ac physical layer frame.

The wireless communication terminal may generate an RL-SIG by adding a subcarrier to the L-SIG signal. The subcarriers further transmitted in the RL-SIG signal are referred to as additional subcarriers. At this time, the wireless communication terminal may signal information through additional subcarriers. This will be described with reference to FIG. 21.

Figure 21:
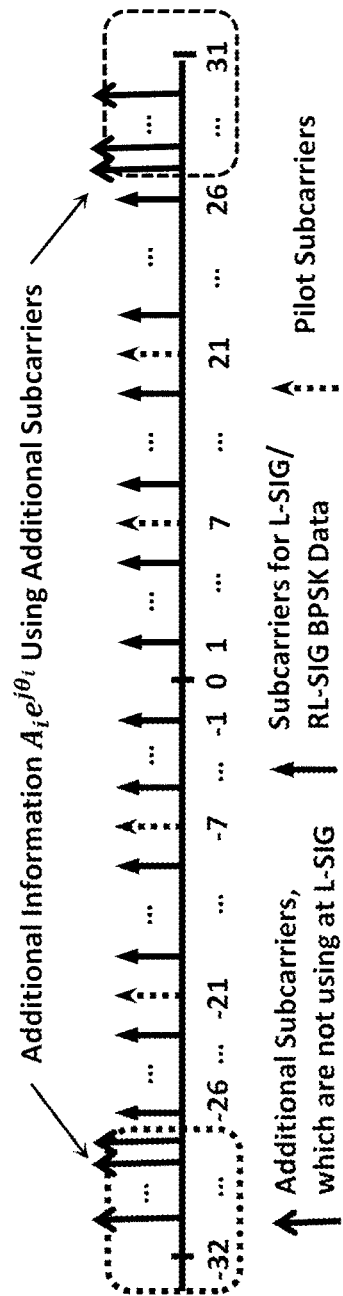
FIG. 21 shows an RL-SIG generated by adding a subcarrier to an L-SIG according to an embodiment of the present invention.

FIG. 21 shows an RL-SIG generated by adding a subcarrier to an L-SIG according to an embodiment of the present invention.

The wireless communication terminal uses a subcarrier whose index value corresponds to −26 to 26 to transmit the L-SIG signal. The wireless communication terminal may transmit subcarriers corresponding to index values other than −26 to 26 as an additional subcarrier. Specifically, the wireless communication terminal may transmit a subcarrier having an index value equal to at least one of −28, −27, 27, and 28 as an additional subcarrier.

In a specific embodiment, the wireless communication terminal may signal information through at least one of the magnitude and phase of the signal transmitted by the additional subcarrier.

In addition, the wireless communication terminal may determine a non-legacy physical layer frame based on an additional subcarrier. For example, when the first symbol transmitted after the L-SIG of the received signal is modulated with BPSK and the subcarrier having an index value of 27 is transmitted, the wireless communication terminal may determine that the received signal is a non-legacy physical layer frame.

Further, the additional subcarriers may be utilized to interpret the information signaled by the remaining subcarriers transmitting the RL-SIG signal. Specifically, additional subcarriers may indicate whether the RL-SIG signal signals additional information. For example, it may indicate whether to transmit additional information to the RL-SIG based on the information transmitted through the additional subcarrier. Further, the additional subcarrier may indicate whether the RL-SIG signal is generated by shifting the phase of the L-SIG signal. Further, the additional subcarrier may indicate whether the RL-SIG signal is generated by changing the magnitude of the L-SIG signal. Further, the additional subcarrier may indicate whether the RL-SIG signal is generated by changing the modulation method of the L-SIG signal.

Further, the additional subcarrier may indicate the size or unit of the frequency section when the RL-SIG signal divides the L-SIG signal by each frequency section and modifies the signal by each frequency section.

In the embodiment of FIG. 21, the positions and the number of pilot subcarriers are the same as the positions and numbers of pilot subcarriers in the L-SIG signal. However, the positions and the number of pilot subcarriers of the RL-SIG signal are not limited thereto. A specific embodiment of the pilot subcarrier of the RL-SIG signal will be described in detail with reference to FIG. 22.

Figures 22, 23:
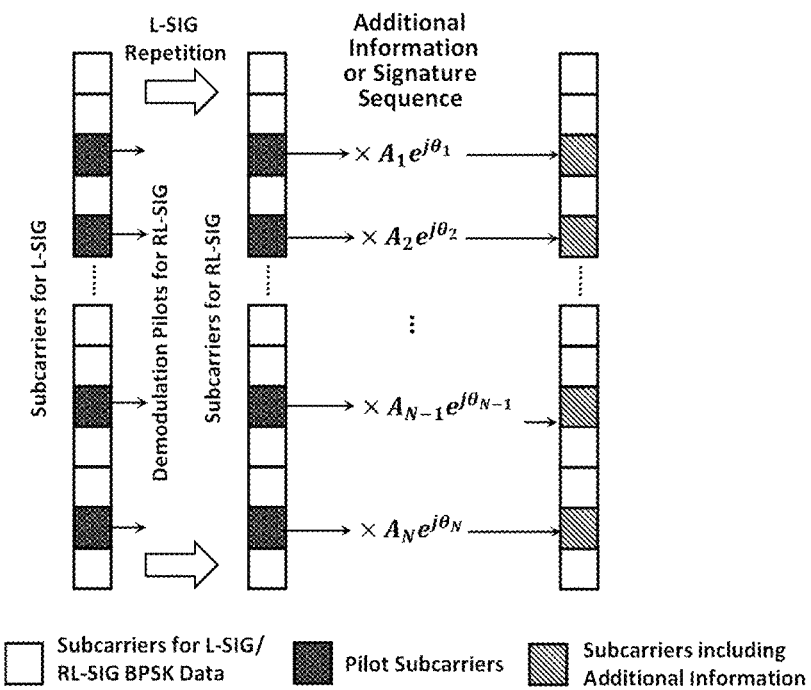
FIG. 22 shows that RL-SIG signals information through a pilot subcarrier according to an embodiment of the present invention.
FIG. 23 shows an equation for obtaining a transmission time of a non-legacy physical layer frame by a wireless communication terminal according to an embodiment of the present invention.

FIG. 22 shows that RL-SIG signals information through a pilot subcarrier according to an embodiment of the present invention.

The wireless communication terminal may signal information through the RL-SIG modulation method. Specifically, the wireless communication terminal may signal information through at least one of the size, phase shift, and location of the pilot subcarrier of the RL-SIG. At this time, the information may be additional information or information indicating that the signal is RL-SIG.

In two consecutive OFDM symbols, it is normal that the channel change is not severe. Therefore, when the wireless communication terminal receive the RL-SIG signal, the wireless communication terminal may perform demodulation using the pilot subcarriers included in the L-SIG signal. In consideration of this, during the RL-SIG transmission, the wireless communication terminal may transmit a smaller number of pilot subcarriers than the number of pilot subcarriers of the L-SIG in the RL-SIG signal. Also, the wireless communication terminal may not transmit the pilot subcarrier in the RL-SIG. Therefore, the wireless communication terminal may transmit a subcarrier for transmitting signaling information to the pilot subcarrier location of the L-SIG.

Also, the location of the data subcarrier of the RL-SIG signal may be different from the location of the data subcarrier of the L-SIG signal. At this time, the location of the pilot subcarrier of the RL-SIG signal may be different from the location of the pilot subcarrier of the L-SIG signal. For example, in the RL-SIG signal, the four pilot subcarriers may be located at both ends of the frequency band, and the data subcarriers may be used to the locations of the pilot subcarriers in the L-SIG signal.

Also, the wireless communication terminal may signal information through a modulation pattern or sequence of pilot subcarriers of the RL-SIG. At this time, the wireless communication terminal receiving the RL-SIG signal may obtain information through correlation characteristics (e.g. correlation) based on the specific pattern or transition state information whose size, phase, etc. applied to the pilot subcarrier is varied. As described above, the information may be additional information or information indicating that the signal is RL-SIG.

In addition, the wireless communication terminal may signal information through at least one of a method of mapping RL-SIG data to a subcarrier and a method of mapping a pilot signal to a subcarrier. Specifically, the wireless communication terminal may specify an index of a subcarrier of RL-SIG by applying an offset to an index mapping of an L-SIG subcarrier. At this time, the wireless communication terminal may signal information through an offset value. For example, the wireless communication terminal may transmit data, which is transmitted through the first subcarrier transmitting the L-SIG, through the third subcarrier of the RL-SIG. At this time, the offset value of the subcarrier mapping may indicate additional information. In another specific embodiment, the wireless communication terminal may specify an index of a subcarrier of RL-SIG by shifting the index of the subcarrier of L-SIG. At this time, the wireless communication terminal may signal information through a shift value. In another specific embodiment, the wireless communication terminal may designate an index of a subcarrier of RL-SIG by performing a mod operation on the index value of the subcarrier of L-SIG. In a specific embodiment, the wireless communication terminal may add an offset to the index of the subcarrier of the L-SIG, and divide the sum value by the designated number to map the data to the index of the subcarrier of the RL-SIG corresponding to the remaining value. For example, the wireless communication terminal may add an offset value to the subcarrier index of the L-SIG, and map the data to the index of the subcarrier of RL-SIG corresponding to the remainder value obtained by dividing the value obtained by adding the offset by 26. The subcarrier index of the RL-SIG applying an offset when the wireless communication terminal maps subcarriers may be applied using at least one of data and subcarriers for pilot transmission. In addition, the wireless communication terminal may apply an offset when mapping not only the subcarriers corresponding to indexes −26 to 26 but also the subcarriers to be transmitted in addition to the indexes −26 to 26.

In addition, the wireless communication terminal may again transmit, through the RL-SIG, only a portion of information included in L-SIG. At this time, the wireless communication terminal may transmit additional information through the remaining fields of the RL-SIG other than the fields for the partial information of the L-SIG.

Through FIGS. 15 to 22, the method in which the wireless communication terminal signals information other than auto detection through the RL-SIG has been described. At this time, specific information that may be signaled includes a new transmission mode of a physical layer frame, information for symbol configuration, information on the structure of a physical layer frame, information for performing CCA, information for decoding a non-legacy signaling field, and information for a wireless communication terminal belonging to another BSS.

Specifically, the new transmission mode of the physical layer frame may include a transmission mode for long range transmission. In a specific embodiment, the transmission mode for long range transmission may indicate that a new structure of physical layer frame for long range transmission is used. In addition, the information for symbol configuration may include at least one of OFDM symbol synchronization, FFT size, and CP length. In addition, the information on the structure of the physical layer frame may include at least one of the number of transmission symbols of the STF/LTF, the transmission order, the type of the signaling field, the length of the signaling field, and the method of interpreting the signaling field. In addition, the information for performing the CCA may include at least one of BSS color, BSS color application, and offset value for the threshold value in the SD/ED to be used during CCA.

The information for decoding the non-legacy signaling field may specifically be information for decoding the TXOP duration indicated by the non-legacy signaling field. Specifically, the information for decoding the non-legacy signaling field may be the granularity of the TXOP duration indicated by the non-legacy signaling field. In yet another specific embodiment, the information for decoding the non-legacy signaling field may be an offset value of the TXOP duration indicated by the non-legacy signaling field.

The information for the wireless communication terminal belonging to another BSS may be information indicating the relative position of the frequency band in which the RL-SIG is transmitted. At this time, the relative position may indicate that the frequency band is high or low. Also, when the 80 MHz+80 MHz frequency band is used, the relative position may indicate either the relatively high frequency band of 80 MHz or the relatively low frequency band of 80 MHz.

A wireless communication terminal belonging to another BSS may have to decode the value of the non-legacy signaling field in order to perform Spatial Reuse (SR). At this time, the wireless communication terminal belonging to another BSS may not know the relative position of the frequency band in which the signal is transmitted, so that when the non-legacy signaling field indicates information for a plurality of frequency bands, the wireless communication terminal belonging to another BSS may not determine which frequency band corresponding to a value of a non-legacy signaling field should be obtained. Accordingly, the wireless communication terminal may transmit information indicating the relative position of the frequency band in which the RL-SIG is transmitted through the RL-SIG. At this time, the wireless communication terminal belonging to another BSS may determine the relative position of the frequency band in which the RL-SIG is transmitted based on the RL-SIG. The wireless communication terminal belonging to another BSS may decode a non-legacy signaling field based on its relative location. For example, the wireless communication terminal belonging to another BSS may decode information on Spatial Reuse (SR) indicated by a non-legacy signaling field based on a relative location.

As described above, when the legacy wireless communication terminal may not know the duration of the non-legacy physical layer frame, the operation efficiency of the legacy wireless communication terminal may be low and a transmission collision may occur between the legacy wireless communication terminal and the non-legacy wireless communication terminal. Specifically, when a non-legacy physical layer frame is transmitted, the legacy wireless communication terminal may not know the duration of the non-legacy physical layer frame and may perform channel sensing repeatedly. Also, if the legacy wireless communication terminal does not repeatedly perform channel sensing, when a non-legacy physical layer frame is transmitted, a legacy wireless communication terminal may attempt transmission and a transmission collision with a non-legacy wireless communication terminal may occur.

To solve this problem, the L-SIG may include length information used for determining the duration of a non-legacy physical layer frame after the L-SIG. For convenience of explanation, the length information is referred to as L_LENGTH.

A method of setting L_LENGTH by the legacy wireless communication terminal and a method of obtaining the duration of the non-legacy physical layer frame according to the L_LENGTH length by the legacy wireless communication terminal will be described with reference to FIGS. 23 to 17.

FIG. 23 shows an equation for obtaining a transmission time of a non-legacy physical layer frame by a wireless communication terminal according to an embodiment of the present invention.

The transmission time TXTIME of the non-legacy physical layer frame is the sum of the duration of a legacy preamble $T_{L\_PREAMBLE}$, the duration of a non-legacy preamble $T_{HE\_PREAMBLE}$, the data duration of a non-legacy physical layer frame $T_{HE\_DATA}$, and the packet extension duration of a non-legacy physical layer frame $T_{PE}$. At this time, the duration of the legacy preamble $T_{L\_PREAMBLE}$ indicates the duration to the legacy signaling field in the duration of the non-legacy physical layer frame. Also, a packet extension indicates a padding added after a Frame Check Sequence (FCS) field of a non-legacy physical layer frame or Forward Error Correction (FEC).

The data duration $T_{HE\_DATA}$ of the non-legacy physical layer frame is the product of the symbol duration THE SYMBOL of the non-legacy physical layer frame and the number N_SYM of symbols of data of the non-legacy physical layer frame. The symbol duration $T_{HE\_SYMBOL}$ of the non-legacy physical layer frame is a value obtained by adding guard interval duration $T_{GI}$ to a signal of 12.8 us length including data excluding the symbol's guard interval cyclic prefix.

FIG. 24 shows an equation for obtaining length information included in L-SIG by a wireless communication terminal according to an embodiment of the present invention.

The legacy wireless communication terminal determines that L_LENGTH is length information included in signaling of the legacy physical layer frame, and indicates the size of data included in the legacy physical layer frame. In wireless communication, data is transmitted by a symbol unit. Also, the duration of a symbol of a non-legacy physical layer frame is different from the duration of a symbol of a legacy physical layer frame. Therefore, the non-legacy wireless communication terminal sets L_LENGTH based on the duration of the symbol of the legacy physical layer frame.

Specifically, the non-legacy wireless communication terminal may set L_LENGTH based on a value obtained by dividing the duration TXTIME-$T_{L\_PREAMBLE}$ of the non-legacy physical layer frame after the L-SIG by the duration aSymbolLength of the symbol of the legacy physical layer frame. Also, as described above, in wireless communication, data is transmitted by a symbol unit, and a legacy wireless communication terminal converts the size of data represented by L_LENGTH into a symbol unit of a legacy physical layer frame to determine the duration of a physical layer frame. Therefore, the non-legacy wireless communication terminal divides the duration of the non-legacy physical layer frame after the L-SIG by the duration aSymbolLength of the legacy physical layer frame symbol and sets L_LENGTH based on the ceiling calculated value 2401.

Therefore, the non-legacy wireless communication terminal sets L_LENGTH based on the duration of the symbol of the legacy physical layer frame. Specifically, the non-legacy wireless communication terminal may set L_LENGTH based on the number of Octets $N_{OPS}$ transmittable per symbol of the legacy physical layer frame. Accordingly, the wireless communication terminal may perform a ceiling operation 2401 on a value obtained by dividing the duration TXTIME-$T_{L\_PREAMBLE}$ of the legacy physical layer frame symbol after L-SIG by the duration aSymbolLength of the legacy physical layer frame symbol, and set L_Legnth based on the value obtained by multiplying the number of Octets $N_{OPS}$ transmittable per symbol of the legacy physical layer frame.

Since the concrete value of the legacy preamble included in the non-legacy physical layer frame is fixed, the wireless communication terminal may apply the following concrete values to calculate L_LENGTH. The L-STF length is 8 us, the L-LTF length is 8 us, and the L-SIG length is 4 us. Therefore, the duration TXTIME-$T_{L\_PREAMBLE}$ of the non-legacy physical layer frame after the L-SIG is a value obtained by subtracting 20 us from the duration of the non-legacy physical layer frame. Also, the duration aSymbolLength of the legacy physical layer frame symbol is 4 us/symbol. When L_DATARATE is 6 Mbps, the number of Octets $N_{OPS}$ transmittable to one symbol with a duration of 4 us is 3.

The legacy physical layer frame is located after the field indicating the length information and includes an additional field not included in the length indicated by the length information of the legacy physical layer frame. Therefore, the non-legacy wireless communication terminal may set L_LENGTH based on the structure of the legacy physical layer frame.

Specifically, the non-legacy wireless communication terminal must set L_LENGTH based on the length of the legacy PLCP service field and the length of one PLCP tail field. Specifically, when the non-legacy wireless communication terminal set L_LENGTH, the non-legacy wireless communication terminal should subtract the value based on the sum of the length of the PLCP service field and the length of one PLCP tail field. The legacy physical layer frame further includes a PLCP service field and a PLCP tail field in addition to a preamble corresponding to a legacy preamble of a non-legacy physical layer frame and data. PLCP service field length and PLCP tail field length are in bit units, and L_LENGTH is displayed in byte units, in order to set L_LENGTH, the non-legacy wireless communication terminal divides the length of the PLCP service field and the length of the PLCP tail field by 8 and performs the ceiling operation 2402.

The length of the PLCP service field and the length of the PLCP tail field are fixed. Therefore, in order to set L_LENGTH, the non-legacy wireless communication terminal may divide the length of the PLCP service field and the length of the PLCP tail field by 8 and apply 3 to the rounded value.

Therefore, the non-legacy wireless communication terminal may set the value of L_LENGTH through the equation of FIG. 24.

FIG. 25 shows a method of a wireless communication terminal to determine whether the existence of a packet extension is unclear according to an embodiment of the present invention.

If the non-legacy physical layer frame includes the above-mentioned packet extension and the length of the packet extension satisfies a certain condition, a wireless communication terminal receiving a non-legacy physical layer frame may be confused whether the signal transmitting the non-legacy physical layer frame is a symbol of data or a padding according to a packet extension. In particular, when a wireless communication terminal transmits a non-legacy physical layer frame to a plurality of wireless communication terminals through OFDMA, a wireless communication terminal receiving a non-legacy physical layer frame may be confused whether the signal transmitting the non-legacy physical layer frame is a symbol of data or a padding according to a packet extension.

When the wireless communication terminal receiving the non-legacy physical layer frame is confused in such a way, the wireless communication terminal may signal disambiguate information that disambiguate the ambiguity on whether packet extensions of non-legacy physical layer frames are included. At this time, the information that disambiguates ambiguity on whether or not the packet extension of the non-legacy physical layer frame is included may be included in the non-legacy signaling field of the non-legacy physical layer frame. For convenience of description, information that disambiguates ambiguity on whether a packet extension is included is referred to as a PE-Disambiguity field.

The non-legacy wireless communication terminal may set the PE-Disambiguity field based on the duration $T_{SYM}$ of the symbol of the non-legacy physical layer frame and the increment of duration to set the value of L_LENGTH based on the duration aSymbolLength of the symbol of the legacy physical layer frame.

Specifically, in relation to the non-legacy wireless communication terminal, the increment of duration to set the value of L_LENGTH based on the symbol duration aSymbolLength of the symbol of the legacy physical layer frame is a value obtained by multiplying a difference 2501 between a value obtained by performing a ceiling operation on a value obtained by dividing the duration of the non-legacy physical layer frame after the L-SIG by the duration aSymbolLength of the legacy physical layer frame symbol and a value before the ceiling operation by the duration aSymbolLength of the legacy physical layer frame.

If the sum of the increment of duration to set the value of L_LENGTH based on the duration aSymbolLength of the symbol of the legacy physical layer frame and the duration of the packet extension is identical to or greater than the duration $T_{SYM}$ of the symbol of the non-legacy physical layer frame, the non-legacy wireless communication terminal may signal information on the packet extension. This is because the sum of the increment of duration to set the value of L_LENGTH based on the duration aSymbolLength of the symbol of the legacy physical layer frame and the duration of the packet extension indicates the duration of a wireless signal not including real data.

As a result, when the equation of FIG. 25 is satisfied, in relation to the non-legacy wireless communication terminal, PE-Disambiguity disambiguates ambiguity on whether the non-legacy physical layer frames includes the packet extension. For example, when the equation of FIG. 25 is satisfied, the non-legacy wireless communication terminal may set the PE-Disambiguity to 1. In addition, when the equation of FIG. 25 is not satisfied, the non-legacy wireless communication terminal may set the PE-Disambiguity to 0.

Also, as described above, the duration aSymbolLength of the legacy physical layer frame symbol are 4 us. Therefore, 4 us may be applied to the equation of FIG. 25.

However, there is a case that the signaling through the PE disambiguity field is not necessary because it is clear whether the packet extension is included or not. For example, if the GI is 0.8 us or 1.6 us and the duration $T_{PE}$ of the packet extension is either 0, 4 us, or 8 us, it does not always satisfy the equation of FIG. 25. Also, if the GI is 3.2 us and the duration $T_{PE}$ of the packet extension is either 0, 4 us, 8 us, and 12 us, the equation of FIG. 25 is not always satisfied. On the other hand, if the GI is 3.2 us and the duration $T_{PE}$ of the packet extension is 16 us, the equation of FIG. 25 is always satisfied. If the duration $T_{PE}$ of the allowed packet extensions is limited by the packet extension capability of the wireless communication terminal, the wireless communication terminal may determine whether the PE disambiguity field needs to be set through the GI value.

Therefore, the non-legacy wireless communication terminal may signal other information through the PE disambiguity field. In a specific embodiment, the non-legacy wireless communication terminal may signal CRC information for the signaling field through the PE disambiguity field.

FIG. 26 shows a method of determining the length of a packet extension by a wireless communication terminal according to an embodiment of the present invention.

The wireless communication terminal receiving the non-legacy physical layer frame may obtain the number of symbols $N_{SYM}$ including data based on the value of the L_LENGTH field and the value $b_{PE\_Disambiguity}$ of the PE disambiguity field. Specifically, the wireless communication terminal obtains the duration of a symbol of data based on the L_LENGTH field. For this, the wireless communication terminal obtains the duration of the non-legacy physical layer frame except the legacy preamble by adding 3, which is the value 2602 obtained by converting the lengths of the PLCP service field and PLCP tail field into bytes, to L_LENGTH, then dividing it by three bytes, which the data size 2603 transmittable by one symbol transmitting a legacy physical layer frame, and multiplying it by 4 us, which is the duration of the symbol of the legacy physical layer frame. The wireless communication terminal subtracts 2601 the duration THE-PREAMBLE of the non-legacy preamble from the duration of the non-legacy physical layer frame excluding the obtained legacy preamble, and performs a flooring operation on a value obtained by dividing it by the duration $T_{SYM}$ of the symbol of the non-legacy physical layer frame. The wireless communication terminal obtains the number of symbols $N_{SYM}$ including the data by subtracting the value $b_{PE\_Disambiguity}$ of the PE disambiguity field from the value obtained through the flooring operation value.

The wireless communication terminal obtains the duration $T_{PE}$ of the packet extension based on the number of symbols $N_{SYM}$ including the data and the value of L_LENGTH. Specifically, the wireless communication terminal subtracts the duration $N_{SYM} \times T_{SYM}$ of the symbol of the data from the value 2601 obtained by subtracting the duration THE-PREAMBLE of the non-legacy preamble from the duration of the non-legacy physical layer frame excluding the legacy preamble, and then divide it by 4 us, which is the duration of the symbol of the legacy physical layer frame. At this time, the value acquired by the wireless communication terminal includes an additional time for adjusting the value to the duration value of the symbol of the legacy physical layer frame. Therefore, the wireless communication terminal applies the flooring operation to the obtained value, and again multiplies the flooring value by 4 us, which is the duration of the symbol of the legacy physical layer frame, to obtain the duration $T_{PE}$ of the packet extension.

FIG. 27 shows that a legacy wireless communication terminal obtains the duration of a non-legacy physical layer frame based on L_LENGTH according to an embodiment of the present invention.

The legacy wireless communication terminal obtains the duration RXTIME of the non-legacy physical layer frame based on L_LENGTH. Specifically, the legacy wireless communication terminal may access the wireless medium based on the obtained duration of the non-legacy physical layer frame.

Specifically, the legacy wireless communication terminal may obtain the duration RXTIME of the non-legacy physical layer frame based on L_LENGTH, the length of the PLCP service fields, and the length of one PLCP tail field. Specifically, L_LENGTH may be converted into the number of non-legacy symbols based on the size $N_{OPS}$ of data that one symbol of the legacy physical layer frame may transmit. At this time, the size $N_{OPS}$ of the data transmittable by one symbol of the legacy physical layer frame is expressed in units of Octets (bytes). In addition, the legacy wireless communication terminal converts the length of the PLCP service field and the length of one PLCP tail field into byte units. The legacy wireless communication terminal divides the length of the PLCP service field and the length of one PLCP tail field, which are converted in byte units, by the size $N_{OPS}$ of data transmittable by one symbol of the legacy physical layer frame to convert the length of the PLCP service field and the length of one PLCP tail field into symbol units. The legacy wireless communication terminal performs a ceiling operation on L_LENGTH and the length of the PLCP service fields and the length of one PLCP tail field, which are converted in symbol units. As described above, wireless communication is performed in symbol units.

The legacy wireless communication terminal obtains the duration of the non-legacy physical layer frame by multiplying the ceiling operation value by the duration aSymbolLength of the symbol of the legacy physical layer frame and adding the duration $T_{L\_PREAMBLE}$ of the preamble of the legacy physical layer frame.

As described above, the length of the PLCP service field and the length of one PLCP tail field are converted into byte units, and its ceiling operation value is 3. Also, the number of bytes $N_{OPS}$ transmittable by one symbol of the legacy physical layer frame is 3. Also, the duration aSymbolLength of the symbol of the legacy physical layer frame symbol is 4 us. Since the L-STF length is 8 us, the L-LTF length is 8 us, and the L-SIG length is 4 us, the duration $T_{L\_PREAMBLE}$ of the preamble of the legacy physical layer frame is 20 us.

Therefore, by applying this value, the equation of FIG. 27 may be obtained, and the legacy wireless communication terminal may obtain the duration RXTIME of the non-legacy physical layer frame according to the equation of FIG. 27.

As described above, the legacy wireless communication terminal transmits data in symbol units of a legacy physical layer frame. Also, when the legacy wireless communication terminal obtains the duration of the non-legacy physical layer frame based on the L_LENGTH, the legacy wireless communication terminal performs a ceiling operation based on the value obtained by dividing the size of data transmittable by one symbol of the legacy physical layer frame. Thus, the legacy wireless communication terminal may process L_LENGTH having different lengths as the duration of a non-legacy physical layer frame of the same size. At this time, the range of the L_LENGTH, which is regarded as the duration of non-legacy physical layer frames of the same size, is determined according to the data size the size of data transmittable by one symbol transmitting a legacy physical layer frame. For example, it is assumed that a data size that one symbol of a legacy physical layer frame may transmit is 3 bytes. At this time, the legacy wireless communication terminal acquires the duration RXTIME of the same non-legacy physical layer frame even if the value of the L_LENGTH changes from 31 to 32 or 33. With this feature, the non-legacy physical wireless communication terminal may signal information other than the duration of the non-legacy physical layer frame with the value of the L_LENGTH.

In a specific embodiment, through the remaining value when the L_LENGTH is divided by the size of data transmittable by one symbol of the legacy physical layer frame, the non-legacy physical wireless communication terminal may signal information other than the duration of a non-legacy physical layer frame. As described above, the size of data that one symbol of a legacy physical layer frame may transmit is 3 bytes. Furthermore, the L_LENGTH field indicates the length in byte units. Therefore, the non-legacy physical wireless communication terminal may signal information other than the duration of the non-legacy physical layer frame through the remainder when the L_LENGTH is divided by 3.

When using this signaling method, the modification in the signaling information does not affect the operation of the legacy wireless communication terminal. Also, through this signaling method, the non-legacy wireless communication terminal may transmit additional information without using additional transmission resources.

Information other than the duration of the non-legacy physical layer frame may be in the format of a non-legacy signaling field. At this time, the format of the non-legacy signaling field may indicate whether or not a specific field is included. For example, the format of the non-legacy signaling field may include whether or not the HE-SIG-B field is included. In yet another specific embodiment, the format of the non-legacy signaling field may be whether HE-SIG-A is repeated.

Also, the non-legacy wireless communication terminal may signal the format of the non-legacy signaling field by combining the L_LENGTH value with the modulation method of the symbol transmitting the HE-SIG-A. Specifically, the modulation method of the first symbol transmitting HE-SIG-A is BPSK. This is for auto detection of non-legacy wireless communication terminals as described above. Therefore, the wireless communication terminal may signal the format of the non-legacy signaling field through the modulation method of the second symbol transmitting HE-SIG-A. Specifically, the wireless communication terminal may modulate the second symbol transmitting HE-SIG-A with QBPSK or BPSK.

As described above, through the remaining value when the L_LENGTH is divided by the size of data transmittable by one symbol of the legacy physical layer frame, the non-legacy wireless communication terminal may signal information other than the duration of a non-legacy physical layer frame. For this, when the non-legacy wireless communication terminal sets the length of the L_LENGTH, the non-legacy wireless communication terminal should add or subtract a positive integer less than the size of data transmittable by z of the legacy physical layer frame in the length set based on the duration of the non-legacy physical layer frame. This will be described with reference to FIGS. 28 to 31.

FIG. 28 shows that a wireless communication terminal according to an embodiment of the present invention adds a predetermined range of integers to the format of a non-legacy signaling field while setting L_LENGTH.

As described with reference to FIG. 24, the non-legacy wireless communication terminal may set the L_LENGTH based on the duration of the non-legacy physical layer frame. In order to signal information other than the duration of the non-legacy physical layer frame through the L_LENGTH, the non-legacy wireless communication terminal may add a positive integer m smaller than the size of data transmittable by one symbol of the legacy physical layer frame in the length set based on the duration of the non-legacy physical layer frame. For convenience of explanation, a positive integer smaller than the size of data transmittable by one symbol of the legacy physical layer frame is referred to as m. Specifically, when the data rate of the legacy physical layer frame is 6 Mbps, the size of data that one symbol of the legacy physical layer frame may transmit is 3 bytes. Thus, m may be 1 or 2. Therefore, the non-legacy wireless communication terminal may add 1 or 2 to the length set based on the duration of the non-legacy physical layer frame.

At this time, the value of m may represent information other than the duration of the non-legacy physical layer frame as described above.

The non-legacy wireless communication terminal receiving the non-legacy physical layer frame may obtain information other than the duration of the non-legacy physical layer frame based on the L_LENGTH. Specifically, the non-legacy wireless communication terminal may divide the value of the L_LENGTH by the size of data transmittable by one symbol of the legacy physical layer frame to obtain a value of m, i.e., the remaining, and may obtain information other than the duration of the frame based on the value of m.

As described with FIG. 27, since the legacy wireless communication terminal performs a ceiling operation on a value obtained by dividing the size of data transmittable by one symbol of the legacy physical layer frame, even if the value of m changes, the legacy wireless communication terminal obtains the duration of the legacy physical layer frame. Therefore, the wireless communication terminal may set the value of the L-LENGTH through the equation of FIG. 28, and signal information other than the duration of the non-legacy physical layer frame through the value of m.

FIG. 29 shows a method for determining the length of a packet extension by a wireless communication terminal according to an embodiment of the present invention when adding a predetermined integer according to the format of a non-legacy signaling field while setting L_LENGTH.

As described with reference to FIG. 26, the wireless communication terminal receiving the non-legacy physical layer frame may obtain the number of symbols $N_{SYM}$ including data based on the value of the L_LENGTH field and the value $b_{PE\_Disambiguity}$ of the PE disambiguity field. In addition, the non-legacy wireless communication terminal receiving the non-legacy physical layer frame may obtain the duration $T_{PE}$ of the packet extension based on the L_LENGTH and the number of symbols $N_{SYM}$ including data.

As shown in FIG. 28, m may be added to signal information other than the duration of the non-legacy physical layer frame through the length of the L_LENGTH.

In such a case, since the L_LENGTH includes a value for signaling information other than the duration of the non-legacy physical layer frame, the wireless communication terminal receiving the non-legacy physical layer frame must obtain, in consideration of m, the number of symbols $N_{SYM}$ including the data and the duration $T_{PE}$ of the packet extension.

Thus, a non-legacy wireless communication terminal receiving a non-legacy physical layer frame obtains the value of m by using the remaining obtained by dividing the L-LENGTH by the size of data transmittable by one symbol of the legacy physical layer frame, and obtains the number of symbols $N_{SYM}$ including data based on a value obtained by subtracting the value of m from the value of the L-LENGTH.

In addition, the non-legacy wireless communication terminal receiving the non-legacy physical layer frame may obtain the duration $T_{PE}$ of the packet extension based on the value obtained by subtracting the value of m from the value of the L_LENGTH.

Through the embodiments of FIGS. 28 and 29, a method has been described in which a wireless communication terminal signals information other than the duration of a non-legacy physical layer frame through the L_LENGTH by adding the value of m when the L-LENGTH is set. However, in such a case, the duration of the non-legacy physical layer frame obtained by the legacy wireless communication terminal is longer by one symbol of the legacy physical layer frame compared to a case that information other than the duration of the non-legacy physical layer frame is not signaled through the L-LENGTH. This is because the legacy wireless communication terminal obtains the duration of the non-legacy physical layer frame based on the ceiling operation as described with reference to FIG. 27.

Therefore, according to the embodiments of FIGS. 28 and 29, signaling information other than the duration of the non-legacy physical layer frame through the L-LENGTH affects the operation of the legacy wireless communication terminal. As a result, legacy wireless communication terminals suffer losses in the competition procedure for transmission. A method for signaling information other than the duration of the non-legacy physical layer frame using the L_LENGTH to solve this problem will be described with reference to FIGS. 30 and 31.

FIG. 30 shows that a wireless communication terminal according to an embodiment of the present invention subtracts a predetermined integer according to the format of a non-legacy signaling field while setting L_LENGTH.

As described with reference to FIG. 24, the non-legacy wireless communication terminal may set the L_LENGTH based on the duration of the non-legacy physical layer frame. In order to signal information other than the duration of the non-legacy physical layer frame through the L_LENGTH, the non-legacy wireless communication terminal may subtract a positive integer m smaller than the size of data transmittable by one symbol of the legacy physical layer frame in the length set based on the duration of the non-legacy physical layer frame. For convenience of explanation, a positive integer smaller than the size of data transmittable by one symbol of the legacy physical layer frame is referred to as m. Specifically, when the data rate of the legacy physical layer frame is 6 Mbps, the size of data that one symbol of the legacy physical layer frame may transmit is 3 bytes. Thus, m may be 1 or 2. Therefore, the non-legacy wireless communication terminal may subtract 1 or 2 from the length set based on the duration of the non-legacy physical layer frame.

At this time, m may represent information other than the duration of the non-legacy physical layer frame as described above. In other words, a value obtained by subtracting m from the size of data transmittable by one symbol of the legacy physical layer frame may represent information other than the duration of the non-legacy physical layer frame as described above.

As described with reference to FIG. 28 above, the non-legacy wireless communication terminal receiving the non-legacy physical layer frame may obtain information other than the duration of the non-legacy physical layer frame based on the L_LENGTH. Specifically, the non-legacy wireless communication terminal obtains the remaining when the value of the L_LENGTH is divided by the size of data transmittable by one symbol of the legacy physical layer frame by a value obtained by subtracting m from the size of data transmittable by one symbol of the legacy physical layer frame, and may obtain information other than the duration of the non-legacy physical layer frame based on the remaining value (the value obtained by subtracting m from the size of data that one symbol of the legacy physical layer frame may transmit).

As described with reference to FIG. 27, the legacy wireless communication terminal performs a ceiling operation on a value obtained by dividing the size of data that one symbol of a legacy physical layer frame may transmit. Also, the value of m is smaller than the data size of data transmittable by one symbol of the legacy physical layer frame. Therefore, the legacy wireless communication terminal obtains the duration of the same non-legacy physical layer frame even if the value of m changes. In addition, the duration of the non-legacy physical layer frame obtained by the legacy wireless communication terminal is the same as the case that information other than the duration of the non-legacy physical layer frame is not signaled through the L-LENGTH. This is because the legacy wireless communication terminal obtains the duration of the non-legacy physical layer frame based on the ceiling operation as described with reference to FIG. 27. Thus, signaling information other than the duration of the non-legacy physical layer frame through the L_LENGTH by the non-legacy wireless communication terminal does not affect the operation of the legacy wireless communication terminal.

FIG. 31 shows a method for determining the length of a packet extension by a wireless communication terminal according to an embodiment of the present invention when subtracting a predetermined integer according to the format of a non-legacy signaling field while setting L_LENGTH.

As described with reference to FIG. 26, the wireless communication terminal receiving the non-legacy physical layer frame may obtain the number of symbols $N_{SYM}$ including data based on the value of the L_LENGTH field and the value $b_{PE\_Disambiguity}$ of the PE disambiguity field. In addition, the non-legacy wireless communication terminal receiving the non-legacy physical layer frame may obtain the duration $T_{PE}$ of the packet extension based on the L_LENGTH and the number of symbols $N_{SYM}$ including data.

As shown in FIG. 30, m may be subtracted to signal information other than the duration of the non-legacy physical layer frame through the length of the L_LENGTH.

In such a case, since the L_LENGTH includes a value for signaling information other than the duration of the non-legacy physical layer frame, the wireless communication terminal receiving the non-legacy physical layer frame must obtain, in consideration of m, the number of symbols $N_{SYM}$ including the data and the duration $T_{PE}$ of the packet extension.

Thus, a non-legacy wireless communication terminal receiving a non-legacy physical layer frame divides LENGTH by the size of data transmittable by one symbol of the legacy physical layer frame and subtracts the remaining from the size of data transmittable by one symbol of the legacy physical layer frame to obtain a value of m. The non-legacy wireless communication terminal may obtain the number of symbols $N_{SYM}$ including data based on a value obtained by adding the value of m in the value of L_LENGTH.

In addition, the non-legacy wireless communication terminal receiving the non-legacy physical layer frame may obtain the duration $T_{PE}$ of the packet extension based on the value obtained by adding the value of m in the value of L_LENGTH.

Figure 32:
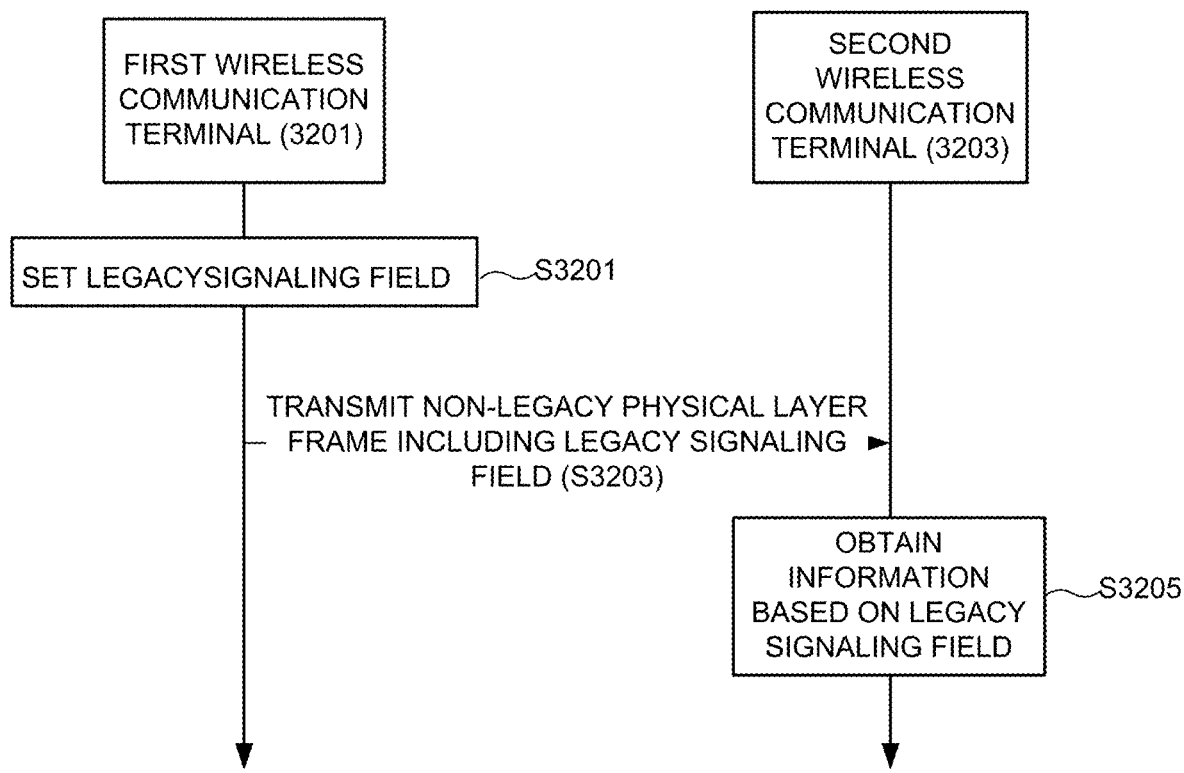
FIG. 32 shows an operation of transmitting a non-legacy physical layer frame and receiving a non-legacy physical layer frame by a wireless communication terminal according to an embodiment of the present invention.

FIG. 32 shows an operation of transmitting a non-legacy physical layer frame and receiving a non-legacy physical layer frame by a wireless communication terminal according to an embodiment of the present invention.

A first wireless communication terminal 3201 sets a legacy signaling field (S3201). At this time, the legacy signaling field may include length information indicating the duration of the non-legacy physical layer frame after the legacy signaling field. At this time, the length information may be the L_LENGTH field described above. In addition, the first wireless communication terminal 3201 may set the value of the length information based on the embodiment described with reference to FIGS. 23 to 31.

Specifically, the first wireless communication terminal 3201 may signal information other than the information indicating the duration of the non-legacy physical layer frame through the length information. In a specific embodiment, the first wireless communication terminal 3201 may signal information other than information indicating the duration of a non-legacy physical layer frame through the remaining value obtained by dividing the length information by the size of data transmittable by one symbol transmitting the legacy physical layer frame. The first wireless communication terminal 3201 may set length information based on a value obtained by subtracting the size of data transmittable by one symbol of the legacy physical layer frame from a value obtained by converting the duration of a non-legacy physical layer frame after the legacy signaling field into the format of the length information and by adding the remaining value.

The first wireless communication terminal 3201 may convert the duration of the non-legacy physical layer frame after the legacy signaling field into the format of the length information based on the duration of one symbol transmitting a legacy physical layer frame and the data size transmitted by one symbol transmitting a legacy physical layer frame. For example, the first wireless communication terminal 3201 may set length information according to the following equation.

$$L\_LENGTH = \lceil (TXTIME - T_{L\_PREAMBLE})/aSymbolLength \rceil \times N_{OPS} - \lceil a/8 \rceil - m$$

L_LENGTH indicates length information. [x] represents the smallest integer among integers greater than or equal to x. TXTIME represents the duration of a non-legacy physical layer frame. $T_{L\_PREAMBLE}$ indicates the duration to the legacy signaling field during the duration of the non-legacy physical layer frame. aSymbolLength represents the duration of one symbol transmitting a legacy physical layer frame. Noes represents the data size that one symbol transmitting a legacy physical layer frame may transmit. a represents the number of bits of a field not included in the length indicated by the length information after the length information in the legacy physical layer frame. m represents a value obtained by subtracting the remaining value from the size of data transmittable by one symbol transmitting the legacy physical layer frame.

In addition, information other than the information indicating the duration of the non-legacy physical layer frame may indicate the format of the non-legacy physical layer frame. Specifically, it may indicate the format of a signaling field indicating the duration of a non-legacy physical layer frame. In a specific embodiment, information other than information indicating the duration of the non-legacy physical layer frame may indicate whether the non-legacy physical layer frame includes a predetermined field. The predetermined field may be at least one of the HE-SIG-B field and the repeated HE-SIG-A field described above.

The first wireless communication terminal 3201 may signal information other than the information indicating the duration of the non-legacy physical layer frame based on the remaining value and the modulation method of the third symbol after the legacy signaling field. At this time, the first wireless communication terminal 3201 may modulate the third symbol after the legacy signaling field with Binary Phase Shift Keying (BPSK) or Quadrature Binary Phase Shift Keying (QBPSK).

The first wireless communication terminal 3201 transmits a non-legacy physical layer frame including a legacy signaling field (S3203). At this time, the first wireless communication terminal 3201 may transmit a repeated legacy signaling field generated based on the legacy signaling field and used for auto detection, after the legacy signaling field. Specifically, the legacy signaling field may be the RL-SIG described with reference to FIGS. 13 to 22.

Also, the first wireless communication terminal 3201 may transmit additional information through the repeated legacy signaling field. Specifically, the first wireless communication terminal 3201 may signal additional information based on a modification in one or more frequency section specific signals included in the legacy signaling field versus one or more frequency section specific signals included in the legacy signaling field. The first wireless communication terminal 3201 may signal additional information based on a change in one or more time section specific signals included in a repeated legacy signaling field versus one or more time section specific signals included in a legacy signaling field. In addition, the first wireless communication terminal 3201 may signal additional information through the modulation method of the repeated legacy signaling field. In addition, the first wireless communication terminal 3201 may transmit additional subcarriers to the repeated signaling field to signal additional information.

The first wireless communication terminal 3201 may transmit a subcarrier transmitting additional information in a location of the pilot subcarrier of the legacy signaling field. The wireless communication terminal may also signal additional information through a modulation pattern or sequence of pilot subcarriers in the repeated legacy signaling field. In addition, the first wireless communication terminal 3201 may signal additional information through at least one of a method of mapping data of the repeated legacy signaling field to a subcarrier and a method of mapping a pilot signal to a subcarrier.

The additional information described above may be at least one of a new transmission mode of the physical layer frame, information for symbol configuration, information on the structure of the physical layer frame, and information for performing CCA. Specifically, the new transmission mode of the physical layer frame may include a transmission mode for long range transmission. In a specific embodiment, the transmission mode for long range transmission may indicate that a new structure of physical layer frame for long range transmission is used. In addition, the information for symbol configuration may include at least one of OFDM symbol synchronization, FFT size, and CP length. In addition, the information on the structure of the physical layer frame may include at least one of the number of transmission symbols of the STF/LTF, the transmission order, the type of the signaling field, the length of the signaling field, and the method of interpreting the signaling field. In addition, the information for performing the CCA may include at least one of BSS color, BSS color application, and offset value for the threshold value in the SD/ED to be used during CCA.

A second wireless communication terminal 3203 obtains information based on the legacy signaling field (S3205). The second wireless communication terminal 3203 may obtain length information indicating the duration of the non-legacy physical layer frame after the legacy signaling field, from the legacy signaling field and obtain information other than the information indicating the duration of the non-legacy physical layer frame by using the value of the length information. Specifically, the second wireless communication terminal 3203 may obtain information other than information indicating the duration of a non-legacy physical layer frame through the remaining value obtained by dividing the length information by the size of data transmittable by one symbol transmitting the legacy physical layer frame.

Also, the second wireless communication terminal 3203 obtains the number of symbols transmitting the non-legacy physical layer frame based on a value obtained by adding the size of data transmittable by one symbol transmitting the legacy physical layer frame to the value of the length information and subtracting the remaining value. In a specific embodiment, the second wireless communication terminal (S3203) may obtain the number of symbols transmitting data of a non-legacy physical layer frame based on the equation of FIG. 31.

Also, the second wireless communication terminal 3203 obtains a duration of a packet extension included in the non-legacy physical layer frame based on a value obtained by adding the size of data transmittable by one symbol transmitting the legacy physical layer frame to the value of the length information and subtracting the remaining value, and the number of symbols transmitting the non-legacy physical layer frame. Specifically, the second wireless communication terminal 3203 may obtain the duration of the packet extension included in the non-legacy physical layer frame based on the equation of FIG. 31.

In addition, the second wireless communication terminal 3203 may obtain information other than the information indicating the duration of the non-legacy physical layer frame based on the remaining value and the modulation method of the third symbol after the legacy signaling field.

Also, the second wireless communication terminal 3203 may obtain additional information through the repeated legacy signaling field. At this time, the second wireless communication terminal 3203 may obtain additional information based on the legacy signaling field and the repeated legacy signaling field. Specific operations of the second wireless communication terminal 3203 may follow the embodiment described with reference to FIGS. 15 to 22.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that communicates wirelessly, the wireless communication terminal comprising:
a transceiver; and
a processor,
wherein the processor is configured to:
receive a non-legacy physical layer frame by using the transceiver,
obtain a legacy signaling field including information decodable by a legacy wireless communication terminal from the non-legacy physical layer frame,
obtain length information indicating information on a duration of the non-legacy physical layer frame, from the legacy signaling field,
obtain information other than information on the duration of the non-legacy physical layer frame based on a modulation method of a third symbol after the legacy signaling field and a remaining value obtained by dividing the length information by a data size transmittable by one symbol of a legacy physical layer frame, wherein the modulation method is Binary Phase Shift Keying (BPSK) or Quadrature Binary Phase Shift Keying (QBPSK), wherein the information other than information on the duration of the non-legacy physical layer frame indicates a format of a non-legacy signaling field included in the non-legacy physical layer frame,
determine, based on the format of the non-legacy signaling field, whether the non-legacy signaling field includes a predetermined signaling field, wherein the non-legacy signaling field includes an HE-SIG-A field, wherein the predetermined signaling field is at least one of repeated HE-SIG-A field and HE-SIG-B field, and
determine a number of symbols of data of the non-legacy physical layer frame according to a following equation, $$N_{SYM} \left\lfloor \left( \frac{L\_LENGTH + m + 3}{3} \right) \times 4 - T_{HE\_PREAMBLE} \right) \bigg/ T_{SYM} \right\rfloor - b_{PE\_Disambiguity}$$

where $\lfloor x \rfloor$ denotes a largest integer less than or equal to x,
L_LENGTH denotes the length information,
m denotes a value obtained by subtracting the remaining value from the data size transmittable by one symbol of the legacy physical layer frame,
$D_{size}$ denotes the data size transmittable by one symbol of the legacy physical layer frame,
$b_{PE\_Disambiguity}$ denotes a value of PE (packet extension) Disambiguity field,
$T_{HE\_PREAMBLE}$ denotes a duration of a non-legacy preamble of the non-legacy physical layer frame,
$T_{SYM}$ denotes a duration of one symbol of the data of the non-legacy physical layer frame,
wherein the PE Disambiguity field is set based on the duration of one symbol of the data of the non-legacy physical layer frame and an increment of duration to set a value of the length information based on a duration of one symbol of the legacy physical layer frame.

2. The wireless communication terminal of claim 1, wherein the processor is configured to obtain a duration of a packet extension which is a padding of the non-legacy physical layer frame, according to a following equation, $$T_{PE} \left\lfloor \frac{\left( \left( \frac{L\_LENGTH + m + 3}{3} \right) \times 4 - T_{HE\_PREAMBLE} \right) - N_{SYM} \times T_{SYM}}{4} \right\rfloor \times 4$$

where $\lfloor x \rfloor$ denotes a largest integer less than or equal to x,
L_LENGTH denotes the length information,
m denotes the value obtained by subtracting the remaining value from the data size transmittable by one symbol of the legacy physical layer frame,
$D_{size}$ denotes the data size transmittable by one symbol of the legacy physical layer frame,
$T_{HE\_PREAMBLE}$ denotes the duration of the non-legacy preamble of the non-legacy physical layer frame,
$T_{SYM}$ denotes the duration of one symbol of the data of the non-legacy physical layer frame.

3. The wireless communication terminal of claim 2, wherein the data size transmittable by one symbol of the legacy physical layer frame is 3 octets when a data rate of the legacy physical layer frame is 6 Mbps.

4. The wireless communication terminal of claim 1, wherein the increment of duration is a value obtained by multiplying a difference between a value obtained by performing a ceiling operation on a value obtained by dividing the duration of the non-legacy physical layer frame after the legacy signaling field by the duration of one symbol of the legacy physical layer frame and the value obtained by dividing the duration of the non-legacy physical layer frame after the legacy signaling field by the duration of one symbol of the legacy physical layer frame by the duration of one symbol of the legacy physical layer frame.

5. A method for operating a wireless communication terminal that communicates wirelessly, the method comprising:
receiving a non-legacy physical layer frame by using the transceiver,
obtaining a legacy signaling field including information decodable by a legacy wireless communication terminal from the non-legacy physical layer frame,
obtaining length information indicating information on a duration of the non-legacy physical layer frame after a legacy signaling field, from the legacy signaling field,
obtaining information other than the information on the duration of the non-legacy physical layer frame based on a modulation method of a third symbol after the legacy signaling field and a remaining value obtained by dividing the length information by a data size transmittable by one symbol of a legacy physical layer frame, wherein the modulation method is Binary Phase Shift Keying (BPSK) or Quadrature Binary Phase Shift Keying (QBPSK), wherein the information other than information on the duration of the non-legacy physical layer frame indicates a format of a non-legacy signaling field included in the non-legacy physical layer frame,
determining, based on the format of the non-legacy signaling field, whether the non-legacy signaling field includes a predetermined signaling field, wherein the non-legacy signaling field includes an HE-SIG-A field, wherein the predetermined signaling field is at least one of repeated HE-SIG-A field and HE-SIG-B field, and
determining a number of symbols of the data of the non-legacy physical layer frame according to a following equation, $$N_{SYM} \left\lfloor \left( \frac{L\_LENGTH + m + 3}{3} \right) \times 4 - T_{HE\_PREAMBLE} \right) \bigg/ T_{SYM} \right\rfloor - b_{PE\_Disambiguity}$$

where [x] denotes a largest integer less than or equal to x,
L_LENGTH denotes the length information, m denotes a value obtained by subtracting the remaining value from the data size transmittable by one symbol of the legacy physical layer frame, $D_{size}$ denotes the data size transmittable by one symbol of the legacy physical layer frame, $b_{PE\_Disambiguity}$ denotes a value of PE (packet extension) Disambiguity field, $T_{HE\_PREAMBLE}$ denotes a duration of a non-legacy preamble of the non-legacy physical layer frame, $T_{SYM}$ denotes a duration of one symbol of the data of the non-legacy physical layer frame, wherein the PE Disambiguity field is set based on the duration of one symbol of the data of the non-legacy physical layer frame and an increment of duration to set a value of the length information based on a duration of one symbol of legacy physical layer frame.

6. The method of claim 5, the method further comprises obtaining a duration of a packet extension which is a padding of the non-legacy physical layer frame, according to a following equation, $$T_{PE}\left[\frac{\left(\frac{L\_LENGTH+m+3}{3}\right)\times 4 - T_{HE\_PREAMBLE}\right) - N_{SYM}\times T_{SYM}}{4}\right]\times 4$$

where [x] denotes a largest integer less than or equal to x,
L_LENGTH denotes the length information, m denotes the value obtained by subtracting the remaining value from the data size transmittable by one symbol of the legacy physical layer frame, $D_{size}$ denotes the data size transmittable by one symbol of the legacy physical layer frame, $T_{HE\_PREAMBLE}$ denotes the duration of the non-legacy preamble of the non-legacy physical layer frame, $T_{SYM}$ denotes the duration of one symbol of the data of the non-legacy physical layer frame.

7. The method of claim 6, wherein the data size transmittable by one symbol of the legacy physical layer frame is 3 octets when a data rate of the legacy physical layer frame is 6 Mbps.

8. The method of claim 5, wherein the increment of duration is a value obtained by multiplying a difference between a value obtained by performing a ceiling operation on a value obtained by dividing the duration of the non-legacy physical layer frame after the legacy signaling field by the duration of one symbol of the legacy physical layer frame and the value obtained by dividing the duration of the non-legacy physical layer frame after the legacy signaling field by the duration of one symbol of the legacy physical layer frame by the duration of one symbol of the legacy physical layer frame.

* * * * *